United States Patent
Kurokawa et al.

(10) Patent No.: US 6,308,630 B1
(45) Date of Patent: Oct. 30, 2001

(54) INTERMEDIATE TRANSFER RECORDING MEDIUM, METHOD OF FORMING PRINT, AND PRINT

(75) Inventors: Shinichi Kurokawa; Jiro Onishi; Katsuyuki Oshima, all of Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/423,204

(22) PCT Filed: Mar. 5, 1999

(86) PCT No.: PCT/JP99/01082

§ 371 Date: Nov. 3, 1999

§ 102(e) Date: Nov. 3, 1999

(87) PCT Pub. No.: WO99/44837

PCT Pub. Date: Sep. 10, 1999

(30) Foreign Application Priority Data

Mar. 6, 1998 (JP) ............................................. P10-054729
Mar. 17, 1998 (JP) ............................................. P10-066675

(51) Int. Cl.⁷ ................................. B41F 1/16; B41M 5/26
(52) U.S. Cl. ........................... 101/492; 156/235; 428/195
(58) Field of Search ........................... 101/492; 347/213; 428/197, 214, 40.2, 40; 156/238, 230, 235

(56) References Cited

U.S. PATENT DOCUMENTS 4,856,857 * 8/1989 Takeuchi et al. ....................... 283/72
4,908,285 * 3/1990 Kushibiki et al. ...................... 428/40

(List continued on next page.)

FOREIGN PATENT DOCUMENTS

| | | |
|---|---|---|
| 049755 A1 * | 5/1992 | (EP) . |
| 0677400 | 10/1995 | (EP) . |
| 0723875 | 7/1996 | (EP) . |
| 63137287 | 6/1988 | (JP) . |
| 03182390 | 8/1991 | (JP) . |
| 03272894 | 12/1991 | (JP) . |
| 04053792 | 2/1992 | (JP) . |
| 04080068 | 3/1992 | (JP) . |
| 06138805 | 5/1994 | (JP) . |
| 06255268 | 9/1994 | (JP) . |
| 07089226 | 4/1995 | (JP) . |
| 07144484 | 6/1995 | (JP) . |
| 07186515 | 7/1995 | (JP) . |
| 08099447 | 4/1996 | (JP) . |
| 08262963 | 10/1996 | (JP) . |
| 08300859 | 11/1996 | (JP) . |

*Primary Examiner*—Eugene Eickholt
(74) *Attorney, Agent, or Firm*—Ladas & Parry

(57) ABSTRACT

An intermediate transfer recording medium is comprised by providing a transfer portion having a receptor layer on a substrate film. The transfer portion is printed with the image and thereafter transferred on a surface of a transfer-receiving material. In the first aspect of the intermediate transfer recording medium, the transfer portion is provided with plural hologram patterns 21 with a hologram mark 22 allocated to each the hologram pattern. According to the first aspect of the invention, since an image is formed on the receptor layer through positioning process using the hologram mark and then the transfer portion is transferred to the surface of the transfer-receiving material, no joint of a print plate appears in the hologram pattern and accuracy of transfer is remarkably excellent. On the other hand, In the second aspect of the intermediate transfer recording medium, peeling strength required to peel the transfer portion from the substrate film at the time when transferring the transfer portion to the transfer-receiving material is controlled in the range of 10 to 150 gf/inch. According to the second aspect of the invention, any transfer failure such as tail-extension or chip of the transfer portion is not caused.

19 Claims, 8 Drawing Sheets

U.S. PATENT DOCUMENTS

| | | | |
|---|---|---|---|
| 5,184,848 | * | 2/1993 | Itoh et al. .................................. 283/2 |
| 5,300,169 | * | 4/1994 | Tahara .................................. 156/230 |
| 5,344,808 | * | 9/1994 | Watanabe et al. .................... 428/195 |
| 5,421,618 | | 6/1995 | Okazaki et al. . |
| 5,744,219 | * | 4/1998 | Tahara .................................. 428/195 |
| 5,770,283 | * | 6/1998 | Gosselin et al. ...................... 428/195 |
| 5,940,111 | * | 8/1999 | Akada et al. ......................... 347/213 |
| 6,012,818 | * | 1/2000 | Araki .................................... 428/214 |
| 6,030,474 | * | 2/2000 | Isono et al. .......................... 156/238 |
| 6,040,268 | * | 3/2000 | Ueno et al. ........................... 428/195 |
| 6,066,378 | * | 5/2000 | Morii et al. .......................... 428/40.2 |

\* cited by examiner

FIG. 13

TABLE 1

|  | Detection mark | Easiness of Mark-formation | Easiness of Mark-reading | joints of Hologram pattern on Image | Positional Accuracy of Image |
|---|---|---|---|---|---|
| Example A1 | hologram Mark | ◎ | ○ | no | ◎ |
| Example A2 | colored detection mark | ○ | ◎ | no | ○ |
| Comparative A1 | printed mark | × | ○ | occur | × |
| Comparative A2 | No | — | — | occur | × |

FIG. 14

TABLE 2

|  | Amount of Polyester (WT parts)*1 | Thickness of Transfer Portion ($\mu$ m) | Peeling Strength (gf/inch) | Transferability | | |
|---|---|---|---|---|---|---|
|  |  |  |  | Tail-extension | Chip | Paper Peeling |
| Example B1 | 5 | 5.55 | 60 | ○ | ○ | ○ |
| Example B2 | 7.5 | 10.55 | 120 | ○ | ○ | ○ |
| Comparative B1 | 2.5 | 5.55 | 5 | × | ○ | ○ |
| Comparative B2 | 5 | 10.55 | 40 | × | ○ | ○ |
| Comparative B3 | 20 | 5.55 | 200 | ○ | × | × |

*1: Amount of polyester : Parts by weight to 100 parts by weight of the Acrylic resin

INTERMEDIATE TRANSFER RECORDING MEDIUM, METHOD OF FORMING PRINT, AND PRINT

TECHNICAL FIELD

The present invention relates to an intermediate transfer recording medium used for forming printed products by recording an image beforehand in a receptor layer and thereafter transferring the receptor layer to a transfer-receiving material, a method for forming printed products by using the intermediate transfer recording medium and printed products formed by the forming method.

More particularly, the present invention relates to an intermediate transfer recording medium provided with a hologram mark for setting the position where an image is formed, a method for forming printed products and printed products formed by using the intermediate transfer recording medium.

Moreover, the present invention relates to an intermediate transfer recording medium whose peeling strength in a transfer step is controlled to transfer a receptor layer, in which an image is recorded, to a transfer-receiving material without transfer failures.

BACKGROUND ART

An intermediate transfer recording medium is conventionally used to form printed products by recording an image beforehand in a receptor layer and thereafter transferring the receptor layer to a transfer-receiving material. Because, in this receptor layer, the image is stored by a thermal transfer recording method using a thermal transfer sheet provided with a colorant layer, a high quality image can be formed depending upon the structural materials of the receptor layer. The intermediate transfer recording medium also allow the receptor layer to have superior adhesion to the transfer-receiving material and to be transferred to the transfer-receiving material very adhesively by interposing an adhesive layer. It is therefore preferably used in the case of using transfer-receiving materials which are so resistant to the transfer of colorants that a high quality image cannot be directly formed and which tend to fuse with colorant layers in a thermal transfer step.

FIG. 12 shows a illustrative sectional view of an example of a typical intermediate transfer recording medium. An intermediate transfer recording medium 101 comprises a substrate film 102 and a transfer portion 112 having at least a receptor layer 105. On the receptor layer 105, an image 106 is formed by thermal transfer using a thermal transfer sheet provided with a colorant layer. The transfer portion 112 with the image 106 formed on the receptor layer 105 is peeled from the substrate film 102 and transferred to a transfer-receiving material to form the objective image 106 on the transfer-receiving material.

The intermediate transfer recording medium 101 is provided with, for instance, a protect layer 104 to prevent deterioration of the image 106 which has been transferred to the transfer-receiving material, thereby improving each weather resistance and finger print resistance of the image 106 and the receptor layer 105. It is also provided with a peelable layer 103 to make it easy to peel the receptor layer 105 and other necessary layers from the substrate film 102. For instance, in an intermediate transfer recording medium 101 as shown in FIG. 12, a receptor layer 105 on which an image 106 is formed is transferred to a transfer-receiving material together with a protect layer 104 and a peelable layer 103. At this time, the receptor layer 105 and other necessary layers (hereinafter called "transfer portion 112") are peeled at the boundary between the peelable layer 103 and the substrate film 102 and are transferred to a transfer-receiving material.

The use of such an intermediate transfer recording medium renders it possible to transfer and form a high quality image with high resolution on a transfer-receiving material. Also, printed products can be made by writing and printing necessary matter such as a signature in advance on a transfer-receiving material and thereafter transferring the transfer portion, on which images such as characters and photographs are formed, from an intermediate transfer recording medium. Hence, the intermediate transfer recording medium may be preferably used for producing printed products including identification cards such as passports, credit cards, ID cards, and the like.

It is required for printed products such as passports and credit cards as aforementioned to give security, specifically, high reliability and safety to resist forgery and falsification. Therefore, various ideas have been developed to resist forgery and falsification made by copying.

The applicant of the present invention has filed with the Japanese Patent Office an application for patent on an intermediate transfer recording medium provided with a hologram pattern, micro-characters and the like in its transfer portion and on a printed product obtained by transferring the transfer portion to a transfer-receiving material to prevent forgery and falsification of printed products such as passports and credit cards. This application is Japanese Patent Application No. H10 (1999)-185354, which was not open to public on the priority date of the application of this case. According to the invention, the hologram pattern and the micro-characters formed on the transfer portion are transferred to the transfer-receiving material together with an image thereby making it difficult to forge and falsify the images such as characters and a photograph of face formed on a printed product, giving high reliability and safety.

In the invention of Japanese Patent Application No. H10 (1999)-185354, preferably the transfer portion has a hologram layer and micro-characters are formed in the hologram layer. It is also preferable that the micro-characters be formed by embossing processing. When micro-characters are formed in the hologram layer, it is extremely difficult to forge. Moreover, when the micro-characters are formed by embossing processing, the micro-characters never appear in the case of copying and hence the invention is more reliable and safer. Preferably the micro-characters are 0.2 point or less in size. Further formation of a lathe or scroll work-pattern in the transfer portion has a better effect on the prevention of falsification.

In the invention of Japanese Patent Application No. H10 (1999)-185354, other than the micro-characters and the lathe or scroll work-pattern, a fluorescent latent image is preferably formed by using materials which absorb light in the range of wavelengths of non-visible light including ultraviolet rays and infrared rays, especially materials which absorb light in the ultraviolet ray range. In the case where the fluorescent latent image is formed in the transfer portion, if the transfer portion is released from the transfer-receiving material with the intention of falsifying particulars printed on the transfer-receiving material, the fluorescent latent image is also broken. When a fluorescent latent image is formed on the transfer-receiving material, the adhesion of the surface of the transfer-receiving material does not become uniform and hence the transfer failure and adhesion failure of the transfer portion tend to be caused. If a fluorescent latent image is formed on the transfer portion of the intermediate transfer recording medium, such a problem is not posed.

However, in such an intermediate transfer recording medium, the joints formed in a processing of a hologram pattern, that is, the joints between hologram patterns at which a hologram pattern ends, when a hologram pattern is processed one after another, appear at constant intervals. Since an image is formed on the receptor layer of the intermediate transfer recording medium without any consideration given to avoid such a joint between hologram patterns, in some cases, an image is formed on the joints between hologram patterns.

When the intermediate transfer recording medium on which an image is formed in this manner is used to produce a printed product, the joints between hologram patterns are found in the image. The resulting printed product is thereby reduced in product value and hence the use of such an intermediate transfer recording medium is undesirable, particularly in the case of producing printed products such as passports for which high reliability and safety are required.

In order to solve such a problem, the applicant has made a trial to prevent an image from being formed on the joints of hologram patterns by forming a detection mark, for setting the position where an image is to be formed, on each individually formed hologram pattern and by detecting the detection mark.

However, if the detection mark is formed by, for instance, printing or ink-jetting in the processing of a hologram pattern, an apparatus for printing the detection mark must be incorporated in a step of processing a hologram pattern. This renders the process complicated, giving rise to many manufacturing problems which are probably a cause of increased cost.

Also, if the detection mark is formed by, for instance, printing and the like after a hologram pattern is processed, the step of processing the hologram pattern is separated from the step of forming the detection mark. There is the case where the problem is posed that the intermediate transfer recording medium is elongated in the step of forming the detection mark so that the position of the hologram mark is not constant relative to the position of the detection mark and hence there is the case where the detection mark is not formed on the exact position where it must be formed. In the case of forming a complicated hologram pattern in particular, the inconstant position of the hologram mark relative to the position of the detection mark probably affects the positional relation between the hologram pattern and the image in the subsequent formation of the image on the intermediate transfer recording medium. Also, in an actual operation, the formation of the detection mark in a separate step is undesirable because it makes the manufacturing step complicated, which is a cause of increased cost.

A first object of the present invention is to provide an intermediate transfer recording medium provided with a hologram mark to set the position of an image to be formed, a method for forming a printed product by using the intermediate transfer recording medium and a printed product formed by such a forming method, thereby solving the aforementioned problem concerning the alignment of the intermediate transfer recording medium.

The intermediate transfer recording medium has other problems also. The peelable layer of the intermediate transfer recording medium is formed for the purpose of peeling the transfer portion from the substrate film with ease to improve the effect of transferring the transfer portion to the transfer-receiving material. The peelable layer is usually formed of a resin, such as polymethacrylates and polyacrylates, having a molecular structure of an acrylic skeleton. The peelable layer is improved in transfer efficiency with the peeling ability thereof from the substrate film. Hence, it is desirable that the peelable layer adhere to the substrate film with necessary and minimum adhesive strength. On the other hand, if the adhesive strength between the peelable layer and the substrate film is excessively weak, excessive extension of the transferred portion, such as tail-extension or burr is caused. Therefore, a polyester resin such as polyethylene terephthalate is usually contained in the peelable layer to adjust the adhesive strength to the extent that the peelable layer is supported in moderation by the substrate film.

In the meantime, the intermediate transfer recording medium has come to be provided with multi-layers including a protective layer and an ultraviolet absorbing layer or the like between the receptor layer and the peelable layer in response to recent diversified demands. The thickness of the transfer portion to be transferred to the transfer-receiving material has come to be very thick.

Since such an increase in the thickness of the transfer portion makes it difficult to cut (namely, difficult layer-cuttability) the transfer portion at the boundary between the portion to be transferred and the portion whose transfer is not required, the transferred portion is accompanied by a part of the portion whose transfer is not required, causing transfer failures such as tail-extension or burr. Moreover, the tail-extended portion and the burred portion fall down from the printed product during conveyance within the printer and adhere to products which are thereafter conveyed, causing product failures such as dusty products.

A second object of the present invention is to provide an intermediate transfer recording medium which controls the force required to separate a transfer portion from a substrate film (hereinafter called "peeling strength") so that the transfer portion on which an image is formed can be transferred without transfer failures while the transfer efficiency of the transfer portion is maintained.

DISCLOSURE OF INVENTION

According to a first aspect of the present invention, the aforementioned first object is attained. In the first aspect of the present invention, an intermediate transfer recording medium comprises at least a substrate film and a transfer portion which is formed on the substrate film in a peelable manner, the transfer portion having at least a receptor layer on which an image is to be formed, wherein the transfer portion is provided with plural hologram patterns and hologram marks respectively allocated to each hologram pattern.

According to the intermediate transfer recording medium of the first aspect, a hologram mark is formed for each hologram pattern formed in the transfer portion. It is therefore possible to form an image by a thermal transfer method using a thermal transfer sheet at a predetermined position on the receptor layer provided with a hologram pattern by detecting the hologram mark. Hence, it is possible to be free from the phenomenon that an image is transferred to and formed on the joints between hologram patterns. Further, no joint appears on an image of the printed product obtained in the subsequent transfer step, providing a high quality product. Also, since the mark to be detected is not formed in a step of, for instance, printing but is a hologram mark, it can be formed in the same processing step with a hologram pattern. Hence, the formation of the hologram mark is simple, making the production easy. Moreover, even if the intermediate transfer recording medium is elongated in the production step, the degree of elongation of the intermediate transfer recording medium accords with that of the hologram mark. Thus, the position of the hologram mark is constant relative to the position of the hologram pattern. The subsequent image can be formed on the position where it must be formed relative to the position of the hologram pattern. Also, the hologram mark may be utilized as an alignment mark when an adhesive layer is transferred to the intermediate transfer recording medium after an image has been formed and hence the adhesive layer can be transferred to a predetermined position. Further, the hologram mark can serve as a mark for setting the position, the transfer portion of which should be located on the surface of the transfer-receiving material, when the transfer portion of the intermediate transfer recording medium is transferred to the transfer-receiving material. Hence, the transfer portion can be transferred exactly to a given position on the transfer-receiving material. In addition, the hologram mark may be formed as a mark for setting the position where a colored detection mark is formed on the receptor layer of the intermediate transfer recording medium by using a thermal transfer sheet.

Moreover it is desirable that the aforementioned intermediate transfer recording medium be a continuous sheet and an end mark which scatters light, particularly an end mark formed of hologram be provided at the terminal portion of the continuous sheet.

According to this embodiment, the end mark notifying the end of the continuous sheet-like intermediate transfer recording medium scatters light like the hologram mark and can be hence detected by the same detector that detects the hologram mark, that is, by a detector which detects the scattered light.

In the first aspect of the present invention, a first method for forming a printed product comprises:
 a step of providing an intermediate transfer recording medium comprising at least a substrate film and a transfer portion formed on the substrate film in a peelable manner wherein the transfer portion has at least a receptor layer on which an image is to be formed and is provided with plural hologram patterns and hologram marks respectively allocated to each hologram pattern, and further providing a thermal transfer sheet provided with a colorant transferable portion;
 a step of detecting the hologram mark to set the position where an image is to be formed on the receptor layer and transferring a colorant to the set position from the colorant transferable portion of the thermal transfer sheet to form the image; and
 a step of further detecting the hologram mark thereafter to set the position of the transfer portion which must be transferred to a transfer-receiving material and transferring the transfer portion of the set position to the transfer-receiving material to form a printed product.

According to the first formation method, a hologram mark is formed for each hologram pattern formed on the intermediate transfer recording medium and the hologram mark is detected to set the position to be endowed with an image when the image is formed on the intermediate transfer recording medium. Hence, the image can be formed exactly on a predetermined position of the receptor layer but is never formed on the joints between the hologram patterns unlike the case of using a conventional method. Further, in the case of transferring the transfer portion of the intermediate transfer recording medium on which an image has been formed, the hologram mark is detected to set the position of the transfer portion which must be transferred. Hence, an exact position of the transfer portion can be transferred on a given position of the transfer-receiving material.

Moreover, in the first method for forming a printed product, the aforementioned provided intermediate transfer recording medium is a continuous sheet and an end mark which scatters light is provided at the terminal portion of the continuous sheet, wherein by detecting the end mark, it is possible to notify the terminal portion of the continuous sheet.

According to this embodiment, when the intermediate transfer recording medium made of a continuous sheet is used, the end mark formed to notify the end of the continuous sheet scatters light like the hologram mark and can be hence detected by the same detector that detects the hologram mark, that is, by a detector which detects the scattered light.

In addition, preferably the detection of the hologram mark or the end mark is made by making light emit from a light emitting element and diffract or scatter on the hologram mark or the end mark and by detecting the diffracted or scattered light by using light receiving element.

According to this preferred embodiment, the end mark is designed to produce scattered or diffracted light like the hologram mark, whereby the setting of the position where the image is to be formed on the receptor layer, the setting of the position of the transfer portion which must be transferred to the transfer-receiving material and the detection of the terminal portion of the continuous sheet are made all using a light emitting element and a light receiving element. This embodiment is therefore efficient.

In the first aspect of the present invention, a second method for forming a printed product comprises:
 a step of providing an intermediate transfer recording medium comprising at least a substrate film and a transfer portion formed on the substrate film in a peelable manner wherein the transfer portion has at least a receptor layer on which an image is to be formed and is provided with plural hologram patterns and hologram marks respectively allocated to each hologram pattern, and further providing a thermal transfer sheet provided with a colorant transferable portion;
 a step of detecting the hologram mark to set the position where a colored detection mark is to be formed on the receptor layer and transferring a colorant to the set position from the colorant transferable portion of the thermal transfer sheet to form the colored detection mark;
 a step of detecting the colored detection mark to set the position where an image is to be formed on the receptor layer and transferring a colorant to the set position from the colorant transferable portion of the thermal transfer sheet to form the image; and
 a step of further detecting the colored detection mark thereafter to set the position of the transfer portion which should be transferred to a transfer-receiving material and transferring the set position of the transfer portion to the transfer-receiving material to form a printed product.

The second method for forming a printed product is an improved one of the aforementioned first method for forming a printed product. That is, in the first formation method, a relative expensive detector consisting of light emitting elements, light receiving elements and the like is required. For instance, in the case where the formation of an image on the receptor layer and the transfer of the transfer portion to the transfer-receiving material are made in one apparatus, two detector sets for hologram mark are required in the apparatus. Moreover, in the case where the formation of an image on the receptor layer and the transfer of the transfer portion to the transfer-receiving material are respectively made in separate apparatuses, a detector for hologram mark is required for each apparatus. This probably causes the detectors to weigh heavy on the apparatus cost. Also, there is a fear that a conventional transfer apparatus in which a colored detection mark is detected to form an image and to transfer the transfer portion cannot be used. Moreover, since a detector for detecting the hologram mark must detect the diffracted light which is reflected, it is slightly complicated, for instance, in sensitivity control and in control of the positions of the receiving optics to be disposed. When these controls are insufficiently made, there is a fear that a detection failure is caused and hence a misregistration is caused.

According to the second method of the present invention for forming a printed product, such a problem can be solved. A hologram mark is formed for each hologram pattern formed in the intermediate transfer recording medium. When an image is formed on the intermediate transfer recording medium, the hologram mark is detected to form a colored detection mark firstly on the intermediate transfer recording medium and then this colored detection mark is used as a standard mark to set the position on which the subsequent image is formed. Hence, the image can be formed at a predetermined position more accurately. Also, unlike conventional cases, no image is formed on the joint between hologram patterns. Also when the transfer portion of the intermediate transfer recording medium on which an image has been formed is transferred to the transfer-receiving material, the position of the transfer portion to be transferred is set by detecting the colored detection mark. The transfer portion can be transferred to a predetermined position of the transfer-receiving material more accurately. Also, in this invention, the hologram mark is detected only when the colored detection mark is formed and the colored detection mark is used as a reference when an image is thereafter formed and when the transfer portion is transferred to the transfer-receiving material. The present invention is sufficed by involving only one complicated control step using a hologram mark as a reference. As a consequence, the possibility of detection failures is reduced and misregistration is scarcely caused. In the case where the image formation and the transfer of the transfer portion to the transfer receiving material are carried out in one apparatus, it is sufficed by preparing only one relatively expensive detector set for detecting a hologram mark. In the case where the above both steps are carried out in separate apparatuses, it is possible to use a conventional transfer apparatus which performs a transfer and the like by detecting a colored detection mark.

In the above second method for forming a printed product, the above colored detection mark is preferably formed by using a heat-meltable ink.

According to this embodiment, the colored detection mark formed by using the heat-meltable ink can be detected accurately by means of an inexpensive and easily controllable transmission type sensor. Image formation and transfer of the transfer portion can be performed on each set position with accuracy.

In the first aspect of the present invention, there is provided a passport made by the above first or second method for forming a printed product.

According to the first aspect of the present invention, an image having high quality and gradation can be transferred exactly to a predetermined position of the intermediate transfer recording medium provided with a hologram pattern. Also, the transfer portion on which an image has been formed can be transferred to a predetermined position of a passport booklet. Therefore, an image free from color shift and misregistration is formed on the resulting passport. In a passport, particulars for identification, such as a photograph of face, a name, nationality and a signature and microcharacters and a lathe or scroll work-pattern for preventing forgery and falsification must be printed or described on each exact position. According to the first aspect of the present invention, the above requirements can be fulfilled.

According to the second aspect of the present invention, aforementioned second object can be achieved. In the second aspect of the present invention, an intermediate transfer recording medium comprises at least a substrate film and a transfer portion provided on the substrate film in a peelable manner, the transfer portion having at least a receptor layer on which an image is to be formed, wherein, when the transfer portion is transferred to the transfer-receiving material, the peeling strength required to peel the transfer portion from the substrate film is 10 to 150 gf/inch.

According to the second aspect of the present invention, the transfer portion with the receptor layer on which an image has been formed is peeled from the substrate film by the peeling strength of 10 to 150 gf/inch. When the transfer portion is transferred to the transfer-receiving layer, the efficiency in transferring the transfer portion is kept and transfer failures, such as, tail-extension and chips are not caused.

Preferably the transfer portion has a peelable layer at its facemost portion of the side near the substrate film, the peelable layer comprises a resin having acrylic molecule structure (an acrylic skeleton resin) as its major component, and containing a polyester resin in an amount of 3 to 10 parts by weight based on 100 parts by weight of the acrylic skeleton resin.

According to this embodiment, the transfer portion is peeled from the substrate film by the peeling strength of 10 to 150 gf/inch which causes no transfer failures, such as tail-extension and chips and the peeling takes place primarily between the peelable layer containing an acrylic skeleton resin as its major component and the substrate film. Hence, the transfer portion can be transferred to the transfer-receiving material without any transfer failure.

Also, when the transfer portion is formed using a resin having the above composition, the transfer portion is layer-cut thoroughly at the boundary between the portion to be transferred and the portion whose transfer is not required and hence the transfer portion can be transferred without transfer failures and product failures even if the thickness of the transfer portion is increased to 3 $\mu$m or more.

Preferably the transfer portion is provided with a hologram layer and the hologram layer is provided to locate between the receptor layer and the substrate film.

According to this embodiment, a hologram layer, which is frequently arranged when high security is needed, specifically, it is needed to make it difficult to commit any forgery and falsification and high reliability and safety are needed as in the case of passports and identification cards, can be formed as a part of the transfer portion of the intermediate transfer medium. The hologram layer can be thereby transferred to the transfer-receiving material, for which security is required, without transfer failures, such as tail-extension and chips.

BRIEF DESCRIPTION OF DRAWINGS

FIG. 13 is Table 1 in which the test results of Example A series are listed;

FIG. 14 is Table 2 in which the test results of Example B series are listed.

BEST MODE FOR CARRYING OUT THE INVENTION

The present invention will be hereinafter explained with reference to the drawings. Parts common to all figures are represented by the same symbols.

Figure 1:
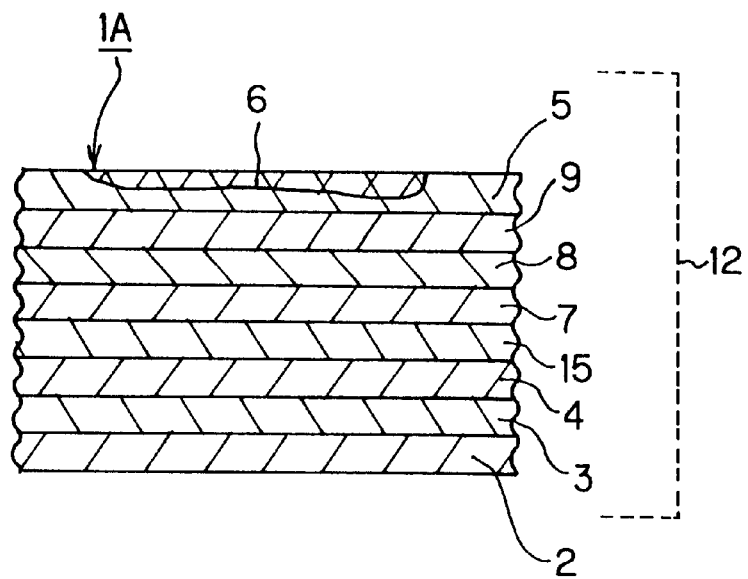
FIG. 1 is a sectional view showing an example of an intermediate transfer recording medium according to a first aspect of the present invention.

FIG. 1 is a sectional view showing an example of an intermediate transfer recording medium according to a first aspect of the present invention. An intermediate transfer recording medium 1A is a sheet-like laminate material consisting of a substrate film 2 and a transfer portion 12 formed on the substrate film 2 in a peelable manner. The transfer portion 12 is provided with at least a receptor layer 5 to be endowed with an image. In the transfer portion 12, a peelable layer 3, a protect layer 4, an ultraviolet absorbing layer 15, a hologram layer 7, a transparent deposition layer 8, an anchor layer 9 and the receptor layer 5 are laminated in this order from the side of the substrate film 2. A hologram pattern and a hologram mark allocated to each hologram pattern are formed on the hologram layer 7. In addition, micro-characters and a lathe or scroll work-pattern may be formed on the transfer portion 12. This intermediate transfer recording medium 1A is used to obtain a printed product by transferring the transfer portion 12, on which an image 6 has been formed, to a transfer-receiving material.

The micro-characters and the lathe or scroll work-pattern may be either formed by printing or printed as variable information by using a thermal head or may be formed also as a hologram pattern. Further, the micro-characters and the lathe or scroll work-pattern may be either formed in a portion separated from a back ground pattern with which the product obtained after a transfer step is completed is decorated or included in the background pattern.

It is preferable that the transfer portion is provided with a hologram layer and micro-characters is formed on the hologram layer. Preferably the micro-characters are formed by embossing processing. When micro-characters are formed on the hologram layer, it is remarkably difficult to commit forgery.

Further, when the micro-characters are embossing-processed, they never appear when they are copied. The reliability and safety of products are thereby improved further. It is desirable that the micro-characters is 0.2 point or less in size. Further formation of a lathe or scroll work-pattern on the transfer portion promotes the effect of preventing falsification.

It is preferable to form a fluorescent latent image other than micro-characters and a lathe or scroll work-pattern on the above transfer portion by using a material which absorbs light in a non-visible range including ultraviolet rays and infrared rays, especially a material which absorbs light in an ultraviolet range. In the case where the fluorescent latent image is formed on the transfer portion, if the transfer portion is released from the transfer-receiving material with the intention of falsifying particulars printed on the transfer-receiving material, the fluorescent latent image is also broken. Also, if a fluorescent latent image is formed on the transfer-receiving material, the adhesion of the surface of the transfer-receiving material does not become uniform, which causes transfer failures and adhesion failures to be easily produced. However, if the fluorescent latent image is formed on the transfer portion of the intermediate transfer recording medium, such a problem is not posed.

The layers formed on the transfer portion 12 except for the receptor layer 5 and the hologram layer 7, for example, the peelable layer 3, the protect layer 4, the ultraviolet absorbing layer 15 and the anchor layer 9 are not necessarily essential layers and are respectively formed by making adequate selection according to, for instance, the quality of the transfer-receiving material and the purpose and working condition of the resulting printed product. No particular limitation is imposed on these layers. Based on the above reason, in place of these layers or in addition to these layers, other layers having a peculiar function may be formed based on adequate selection. It is to be noted that the transparent deposition layer 8 and the anchor layer 9 are usually formed together with the hologram layer 7.

Figure 2:
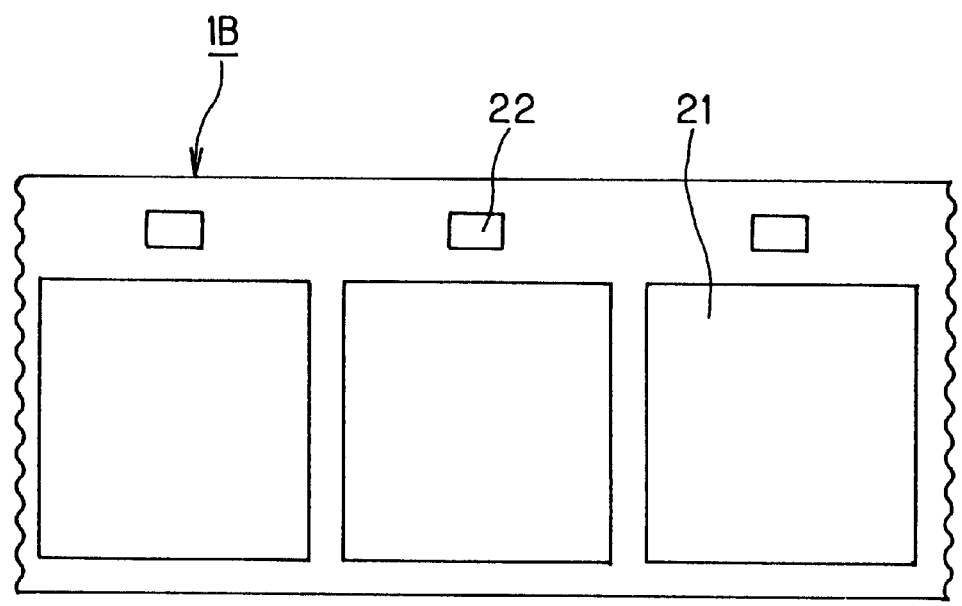
FIG. 2 is a plan view showing another example of an intermediate transfer recording medium according to the first aspect of the present invention.

FIG. 2 is a plan view showing another example of an intermediate transfer recording medium of the present invention. On a hologram layer 7 of an intermediate transfer recording medium 1B, plural hologram patterns 21 and hologram marks which are respectively allocated to each hologram pattern 21 are formed in a constant positional relation.

The hologram pattern 21 is formed to improve the decorative characteristics of the printed product to be finally formed or to prevent forgery and falsification because, for instance, it is difficult to copy it. The hologram pattern is preferably formed when high reliability and safety are needed as in the case of, especially, passports.

The size and shape of the hologram pattern 21 respectively differ depending upon the required condition of the printed product and hence there is no particular limitation to them. As a method for forming the hologram pattern 21, a well-known method may be adopted. For instance, fine irregularities are formed by embossing processing with the use of an original plate provided with an irregular pattern consisting of a hologram interference fringe.

The hologram mark 22 is formed at a constant position relative to each hologram pattern 21 in the same step with the hologram pattern 21, at the same time when the hologram pattern 21 is formed.

The hologram mark 22 formed in this manner functions as the following marks having various functions.

(1) A mark for setting the position where an image is to be formed by a thermal transfer method using a thermal transfer sheet at a predetermined position of the receptor layer 5 provided with the hologram pattern 21;

(2) a mark for setting the position, where an adhesive layer highly adhesive to the receptor layer and the transfer-receiving material is to be transferred, at a predetermined position of the transfer portion of the intermediate transfer recording medium after an image is formed;

(3) a mark for setting the position of the transfer portion to be transferred to the transfer-receiving material at a predetermined position of the intermediate transfer recording medium; or (4) a mark for setting the position where a colored detection mark is to be formed by a thermal transfer method using a thermal transfer sheet on the receptor layer 5 of the transfer portion 12 before an image is formed.

The hologram mark 22 may be formed at any position and there is no particular limitation to the size and shape of the hologram mark 22. Since the hologram mark 22 is formed in the same method that is used to form the hologram pattern 21, the both can be formed at the same time by using the same process plate, which is very efficient.

Figure 3:
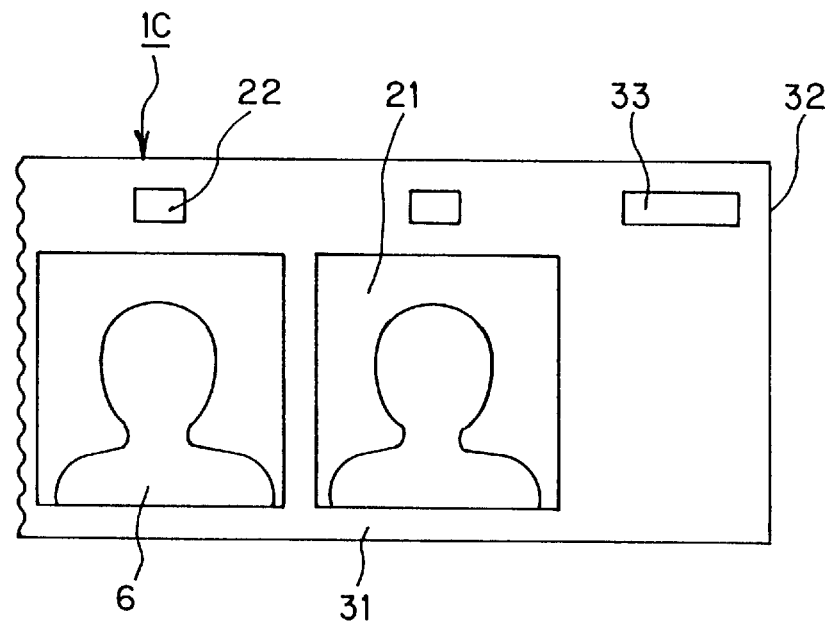
FIG. 3 is a plan view showing an embodiment of the vicinity of the terminal portion when the intermediate transfer medium of the present invention is a continuous sheet.

FIG. 3 is a plan view showing an embodiment of the vicinity of the terminal portion when the intermediate transfer medium of the present invention is a continuous sheet. An end mark 33 is formed in the vicinity of a terminal portion 32 of an intermediate transfer recording medium 1C comprising a continuous sheet 31. The end mark 33 scatters light like the hologram mark 22 and can be hence detected by a detector which detects the hologram mark 22. By detecting the end mark 33, for example, a process for forming an image on the intermediate transfer recording medium IC comprising the continuous sheet 31, or a process for transferring the transfer portion 12 to the transfer-receiving material from the intermediate transfer recording medium 1C comprising the continuous sheet 31 can be stopped.

Although no particular limitation is imposed on the size and shape of the end mark 33, it is necessary to form the end mark 33 such that the diffraction light or scattered light from the end mark 33 can be discriminated from those from the hologram mark 22. For instance, the length of the end mark 33 along the direction of the long side of the continuous sheet 31 is made longer than that of the hologram mark 22, whereby the diffraction light or scattered light from the end mark 33 can be discriminated from those from the hologram mark 22.

The end mark 33 may be those which scatter light and may be formed by applying an aluminum foil or a PET (polyethylene terephthalate) film which is mat-treated or a porous PET film or by mark printing.

Preferably the end mark 33 is formed from a hologram like the hologram mark 22. In this case, the end mark 33 can be formed by a method such as labeling of a hologram seal, which is efficient.

Figure 4:
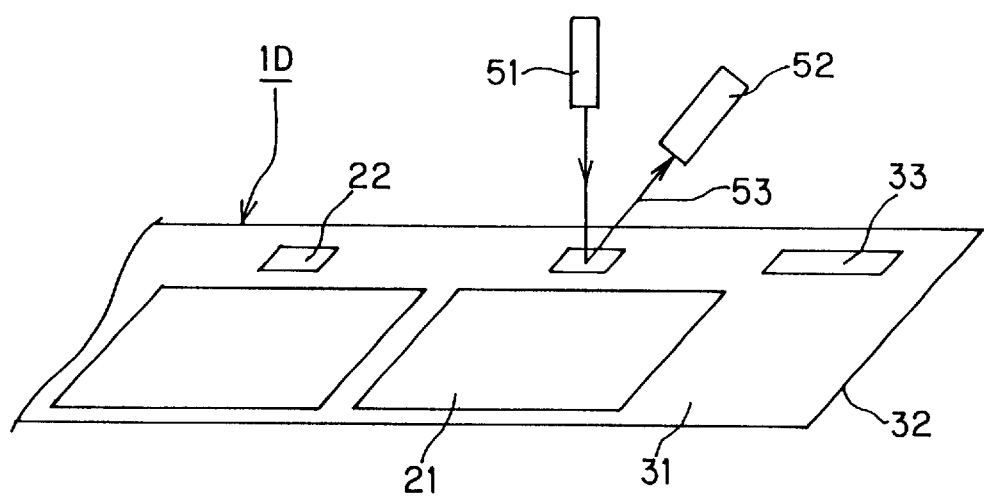
FIG. 4 is a perspective view showing an embodiment for detecting a hologram mark and an end mark which are formed on an intermediate transfer recording medium of the present invention.

FIG. 4 is a perspective view showing an embodiment for detecting a hologram mark and an end mark which are formed on the intermediate transfer recording medium. The light emitted from a light emitting element 51 is irregularly reflected by the hologram mark 22 which is formed for each hologram pattern 21 on the intermediate transfer recording medium 1D to produce a diffraction light 53. This diffraction light 53 is then detected by receiving optics 52, thereby detecting the position of the hologram mark 22. By designing the end mark 33 to scatter light like the hologram mark 22, the setting of the position where an image 6 is to be formed on the receptor layer 5, the setting of the position of the transfer portion 12 to be transferred to the transfer-receiving material and the detection of the terminal of the continuous sheet are all made by the light emitting element and the light receiving element, which is efficient.

As the light emitting element 51 used here, a semiconductor laser, an LED or the like is used in general. However, no particular limitation is imposed to a device to be used as the light emitting element 51 insofar as it likewise works. As the receiving optics 52, for instance, a photosensor is usually used. However, there is no particular limitation to a device to be used as the light receiving element 52 insofar as it likewise works.

Figure 5:
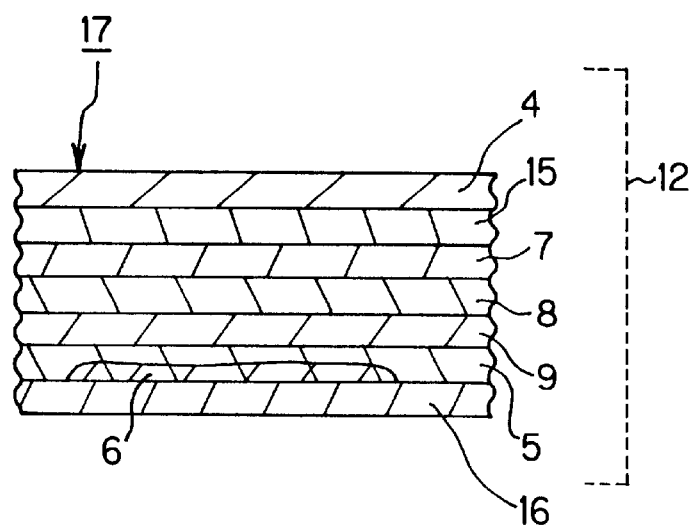
FIG. 5 is a sectional view showing an example of a printed product obtained according to the first aspect of the present invention.

FIG. 5 is a sectional view showing an example of a printed product obtained according to the first aspect of the present invention. A printed product 17 is obtained by transferring the transfer portion 12 onto the transfer-receiving material 16 from the intermediate transfer recording medium 1A whose section is shown in FIG. 1. This printed product 17 comprises the transfer-receiving material 16 and the transfer portion 12 formed on the transfer-receiving material 16. In the transfer portion 12, the receptor layer 5 on which the image 6 is formed, the anchor layer 9, the transparent deposition layer 8, the hologram layer 7, the ultraviolet absorbing layer 15 and the protect layer 4 are laminated in this order from the side close to the transfer-receiving material 16.

The hologram layer 7 is formed with the hologram pattern 21 which coats an image to improve the decorative appearance of the printed product and serves effectively to prevent forgery and falsification.

Next, a first method for forming the printed product of the present invention by using the aforementioned intermediate transfer recording medium will be explained.

Firstly, the above-mentioned intermediate transfer recording medium 1A and a thermal transfer sheet provided with a colorant transferable portion are prepared and pressed between a heating device, such as a thermal head and a platen roll to make a selected heating portion of a heating device generate heat corresponding to the image information, thereby transferring a colorant of the colorant transferable portion formed on the thermal transfer sheet to the receptor layer 5 of the intermediate transfer recording medium 1A to form the image 6.

As the thermal transfer sheet, a conventionally well-known material may be used. On the colorant transferable portion formed on the thermal transfer sheet, colorant layers are formed from a heat-meltable ink or a sublimation dye. The colorant layers formed in the colorant transferable portion are adequately selected from heat-meltable inks or sublimation dyes corresponding to an objective printed product and are alternately provided side by side. The colorant transferable portion comprising a sublimation dye and used to obtain a printed product with high gradation is structured by arranging binder resin layers respectively containing a sublimation dye such as a yellow, magenta, cyan or black dye such that these binder resin layers are alternately provided side by side as required. Also, the colorant transferable portions and adhesive layers are alternately provided side by side whereby the adhesive layers can be successively transferred onto the receptor layer 5 to which a colorant has been transferred. This ensures that the adhesive strength between the transfer portion 12 and the transfer-receiving material 16, when the transfer portion 12 of the intermediate transfer recording medium 1A is transferred to the transfer-receiving material 16, can be improved. Also, a step of transferring the adhesive layer and a step of forming an image by transferring a colorant can be performed at the same time, which is efficient.

The setting of the position where an image is to be formed on the intermediate transfer recording medium is made by detecting the hologram mark 22 formed on the transfer portion 12. Then, a colorant is transferred to the set position from the colorant transferable portion of the thermal transfer sheet to form an image.

In the invention according to the first aspect of the present invention, the intermediate transfer recording medium is provided with the hologram pattern 21 in advance and the image 6 is formed at a predetermined position relative to the hologram pattern 21. Hence, the position where an image is to be formed on the intermediate transfer recording medium is set by detecting the hologram mark 22 formed for each hologram pattern 21. Therefore, an image is formed at a predetermined position of the intermediate transfer recording medium with high accuracy and unlike the case of using a conventional method, no image is formed on the joints between the hologram patterns 22. It is to be noted that a detection mark is usually formed also on the thermal transfer sheet provided with the colorant transferable portion to determine the position of each sublimation dye layer or heat meltable ink layer whereas the position where an image is to be formed on the intermediate transfer recording medium is set by detecting the hologram mark 22.

After the image is formed at a predetermined position on the receptor layer 5 of the intermediate transfer recording medium 1A, the position of the transfer portion 12 which is to be transferred to the transfer-receiving material 16 is set by detecting the hologram mark 22. Then, the transfer portion 12 of the set position is transferred to the transfer-receiving material 16 to form the printed product 17.

For instance, when the transfer-receiving material is a passport or the like, the position, which is to be transferred, in the transfer portion 12 formed on the intermediate transfer recording medium is exactly set, and then the transfer portion 12 is transferred with high accuracy to a predetermined position of a passport booklet.

The transfer portion 12 of the intermediate transfer recording medium is exactly transferred to the resulting printed product 17. Also, misregistration between an image formed in advance on the transfer-receiving material 16 and an image carried by the transfer portion 12 and transferred to the transfer-receiving material is remarkably small. This proves particularly preferable for producing the printed product 17 such as a passport for which high reliability and safety are required.

Next, a second method for forming the printed product of the present invention by using the above intermediate transfer recording medium will be explained.

Like the aforementioned first method for forming a printed product, the intermediate transfer recording medium 1A and a thermal transfer sheet provided with a colorant transferable portion are prepared and pressed between a heating device, e.g., a thermal head and a platen roll to make a selected heating portion of a heating device generate heat corresponding to the image information, thereby firstly transferring a colorant of the colorant layer for colored detection mark on the heat transfer sheet to the receptor layer 5 of the intermediate transfer recording medium 1A to record the colored detection mark prior to the formation of the image 6.

Figure 6:
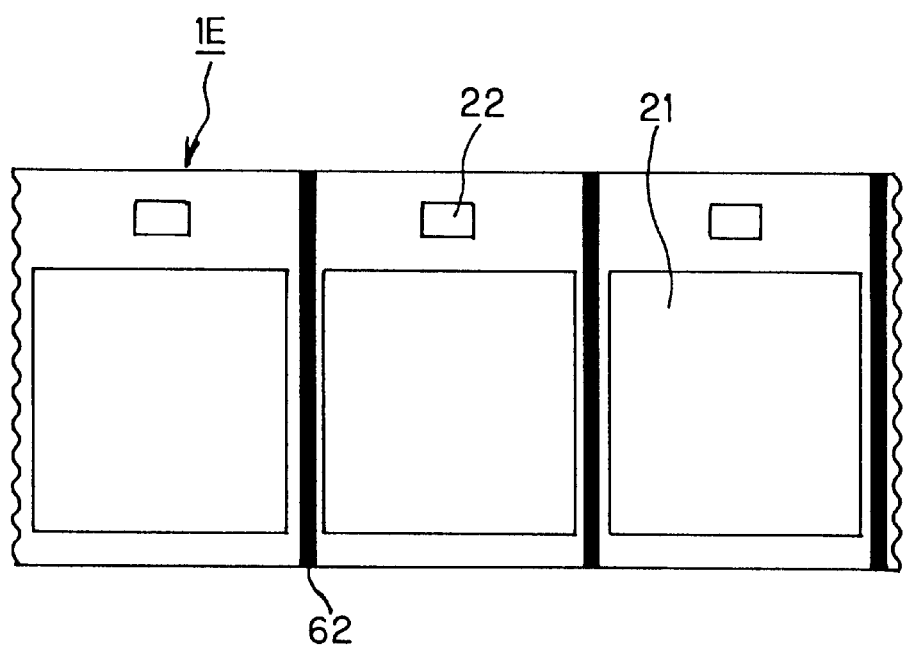
FIG. 6 is a front view showing an example of an intermediate transfer recording medium provided with a colored detection mark according to the first aspect.
Figure 7:
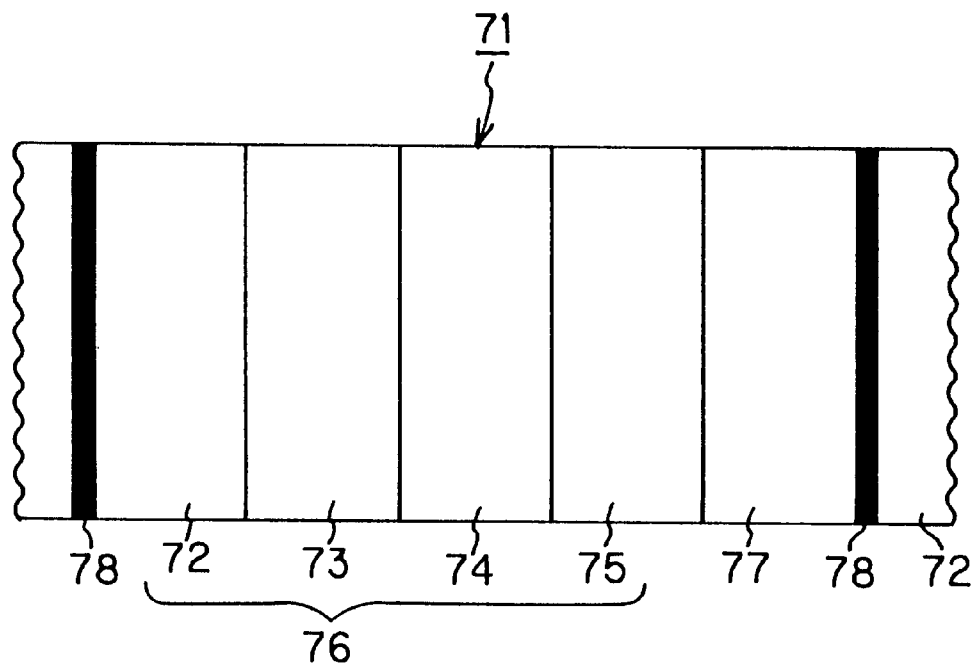
FIG. 7 is an example of a thermal transfer sheet used in a second method according to the first aspect.

FIG. 6 is a plan view showing an example (1E) of an intermediate transfer recording medium provided with a colored detection mark. FIG. 7 is an example (71) of a thermal transfer sheet used in the second method for forming a printed product.

A colored detection mark 62 shown in FIG. 6 is formed by detecting the hologram mark 22 allocated to each hologram pattern 21 to set the position where the colored detection mark 62 is to be formed on the receptor layer 5 and thereafter by transferring a colorant to the set position from the colorant layer 78 for colored detection mark of the thermal transfer sheet 71.

The thermal transfer sheet 71 shown in FIG. 7 comprises, like in the aforementioned first method for producing a printed product, a colorant transferable portion 76 in which sublimation dye layers respectively containing yellow 72, magenta 73, cyan 74, black 75 and the like are alternately provided side by side and a transferable adhesive layer 77 which is, as required, alternately provided side by side. This method differs from the above first method for forming a printed product in the point that the colorant transferable portion 76 is provided with a colorant layer 78 for colored detection mark. A colorant constituting the colorant layer 78 for colored detection mark may be either a sublimation dye or a heat meltable ink. The colored detection mark formed from the heat meltable ink is desirable because it can be exactly detected by an inexpensive and easily-adjustable transmission-type sensor and can make the setting of the position where an image is to be formed, specifically it can make the alignment of each color when multi-colors are overlapped on each other and the setting of the position of the transfer portion to be transferred with high accuracy. It is particularly desirable that the colored detection mark be formed using heat meltable black ink.

Next, the position where the image 6 is to be formed on the intermediate transfer medium 1E is set by detecting the colored detection mark 62 formed on the intermediate transfer recording medium 1E. Then, a colorant is transferred to the set position from the colorant transferable portion 76 of the thermal transfer sheet 71 to form the image 6.

In the second method according to the first aspect of the present invention, the hologram mark 22 provided at a constant position relative to each hologram pattern 21 is detected to form the colored detection mark 62, which will be a reference for setting the position where an image is formed in advance, and the position where the image 6 is to be formed on the receptor layer 5 is set by detecting the colored detection mark 62. Then the image 6 can be accurately formed at a predetermined position of the intermediate transfer recording medium 1E and unlike the case of using a conventional method, no image is formed on the joints between the hologram patterns 21. It is also to be noted that a detection mark is generally provided on the thermal transfer sheet provided with the colorant transferable portion to determine the position of each sublimation dye layer or heat meltable ink layer whereas the position where an image is to be formed on the intermediate transfer recording medium is set by detecting the above colored detection mark 62.

After the image 6 is formed at a predetermined position on the intermediate transfer recording medium 1E, the position of the transfer portion 12 which is to be transferred to the transfer-receiving material 16 is set by further detecting the colored detection mark 62. Then, the transfer portion 12 of the set position is transferred to the transfer-receiving material 16 to form the printed product 17.

For instance, when the transfer-receiving material 16 is a passport or the like, the position, which is to be transferred, in the transfer portion 12 formed on the intermediate transfer recording medium 1E is exactly set by detecting the colored detection mark 62 formed on the intermediate transfer recording medium 1E, and then the part of the transfer portion 12 which is to be transferred can be transferred with high accuracy at a predetermined position on a passport booklet.

Figure 8:
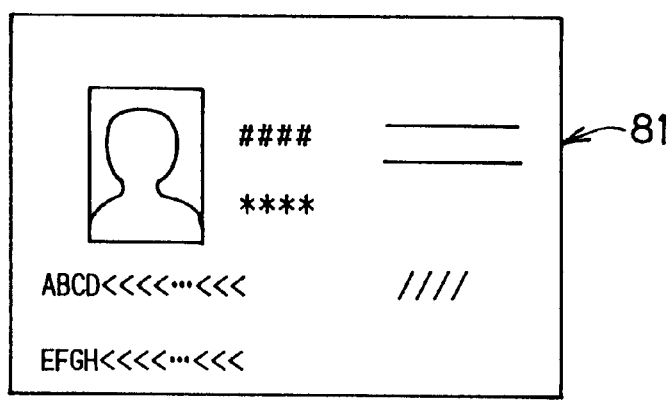
FIG. 8 is a plan view showing an example of a passport provided according to the first aspect of the present invention.

FIG. 8 is a plan view showing an example of a passport of the present invention. The passport 81 can be formed by any one of the aforementioned first and second methods for forming a printed product. Since the passport 81 can be obtained by transferring the transfer portion 12 from the intermediate transfer recording medium, each layer constituting the transfer portion 12 is formed by adequate selection as required.

According to the aforementioned first and second methods for forming a printed product, the image 6 having high quality and gradation can be transferred exactly to a predetermined position of the intermediate transfer recording medium provided with the hologram pattern 21. Also, the part of the transfer portion 12 which is to be transferred can be accurately transferred to a predetermined position on a passport booklet, which is a transfer-receiving material. Therefore, the image 6 free from color shift and misregistration is formed on the resulting passport 81. Particularly, in the passport 81, particulars for identification, such as a photograph of face, a name, nationality and a signature, and micro-characters, a lathe or scroll work-pattern and a fluorescent latent image for preventing forgery and falsification and the like are formed. Therefore, this method is very effective when exact matching with the formed images, such as a photograph of face which are recorded in the intermediate transfer recording medium is needed in relation to the positions of the described particulars provided originally on the passport booklet.

Next, each layer constituting the intermediate transfer recording medium and printed product according to the first aspect of the present invention will be explained.

As the substrate film 2, there may be used the same substrate film that is used for a customary intermediate transfer recording medium as it is and there is no limitation to a material of the substrate film 2. Given as specific examples of materials used preferably as the substrate film 2 are thin paper such as glassine papers, condenser paper and paraffin paper; or, oriented or nonoriented films of plastics such as highly heat resistant polyesters (e.x., polyethylene terephthalate, polyethylene naphthalate, polybutylene terephthalate, polyphenylene sulfide, polyether ketone or polyether sulfone), polypropylene, polycarbonate, cellulose acetate, polyethylene derivatives, polyvinyl chloride, polyvinylidene chloride, polystyrene, polyamide, polyimide, polymethylpentene or ionomers. Also, composite films produced by laminating two or more of these materials may be used. The thickness of the substrate film 2 may be adequately selected according to the type of material such that appropriate strength and heat resistance of the material can be obtained. In general, a substrate film having a thickness of 1 to 100 $\mu$m is preferably used. A rear layer may be formed as required on the surface of the substrate film 2 on the opposite side of the transfer portion 12 by a well-known method.

The rear layer may be formed from the same resin that is currently used to prevent the fusion of the substrate film 2 and a heating device, such as a thermal head, and to improve the slidability when the transfer portion 12 is transferred to the transfer-receiving material by using the intermediate transfer recording medium.

The receptor layer 5 is provided, as a part of the transfer portion 12 constituting the intermediate transfer recording medium, on the outermost surface on the opposite side of the substrate film 2 (that is, at the position most apart from the substrate film). On the receptor layer 5, the image 6 is formed by performing a thermal transfer operation with the use of a thermal transfer sheet provided with a colorant layer. Then, the transfer portion 12 of the intermediate transfer recording medium 1A or 1B on which the image 6 is formed is transferred to the transfer receiving material 16 and the printed product 17 is eventually formed.

In light of this, as materials for forming the receptor layer 5, conventionally well-known resin materials which easily accept colorants such as sublimation dyes or heat-meltable inks may be used. Examples of materials used for the receptor layer 5 include polyolefin type resins such as polypropylene; halogenated resins such as polyvinyl chloride and polyvinylidene chloride; vinyl type resins such as polyvinyl acetate, vinyl chloride-vinyl acetate copolymers, ethylene-vinyl acetate copolymers or polyacrylic acid esters; polyester resins such as polyethylene terephthalate or polybutylene terephthalate; polystyrene type resins; polyamide type resins; copolymer type resins obtained by polymerizing an olefin, such as ethylene or propylene with other vinyl polymers; ionomers; cellulose type resins such as cellulose diacetate; and polycarbonate. Particularly, vinyl chloride type resins, acryl-styrene type resins or polyester type resins are preferable.

When the receptor layer 5 is transferred to the transfer-receiving material through an adhesive layer, the adhesion of the receptor layer 5 is not necessary required. However, when the receptor layer 5 is transferred to the transfer-receiving material without interposing an adhesive layer, it is desirable to form the receptor layer 5 by using an adhesive resin such as vinyl chloride-vinyl acetate copolymers.

The receptor layer 5 may be formed by the following method. A single material or a plurality of materials selected from the above materials are blended, and various additives as required, are added. The resulting mixture is dissolved or dispersed in an adequate solvent such as water or an organic solvent to prepare a coating solution for a receptor layer. The coating solution is applied on the substrate film 2 or on the protect layer 4 or the like, if such a layer is provided, by a gravure method, screen printing method or reverse coating method using a gravure plate, followed by drying. The thickness of the receptor layer 5 is about 1 to 10 $\mu$m in dry condition.

The protect layer 4 is provided as a part of the transfer portion 12 if necessary. The receptor layer 5 is coated with the protect layer 4 after a transfer portion 12 is transferred to the transfer-receiving material to maintain the qualities of the image 6. As materials used to form the protect layer 4, conventionally known materials for protect layer may be used. It is desirable to select a resin composition having desired properties, for instance, fingerprint resistance, required for the surface protect layer. In addition, when wear resistance, chemical resistance and staining resistance are needed, an ionizing radiation hardenable resin may be used as the resin for a protect layer. The protect layer 4 may be formed with the use of materials for protect layer to which lubricants for improving the abrasion resistance of the image-formed products, surfactants for protecting from staining, ultraviolet absorbers for improving weather resistance and antioxidants are added appropriately.

The protect layer 4 can be formed in the same method that is used to form the peelable layer 3. The thickness of the protect layer 4 is preferably 0.1 to 10 μm.

The hologram layer 7 is formed as a part of the transfer portion 12 as required. The receptor layer 5 is coated with the hologram layer 7 after the transfer portion 12 is transferred to the transfer-receiving material, thereby obtaining a printed product which accompanies the hologram pattern 21. The printed product provided with the hologram pattern 21 has a decorative effect and is difficult to be forged by copying. It is therefore preferably used for those requiring security such as credit cards and passports. As materials used for the production of the hologram layer 7, conventionally known materials may be used and there is no particular limitation to the material used for the hologram layer 7. Also, the hologram layer 7 may be formed by the same method that is currently used.

The transparent deposition layer 8 is usually provided in contact with the hologram layer 7 on the side close to the receptor layer 5. Because this transparent deposition layer 8 has a refractive index differing from those of other layers, it has the effect of embossing the pattern of the hologram in the formed printed product. As materials for forming the transparent deposition layer 8, well-known materials, for example, metal oxides or sulfides such as ZnS, $TiO_2$, $SiO_2$ and $Cr_2O_3$ may be used. There is no limitation to the material of the transparent deposition layer 8. Also, the transparent deposition layer 8 may be formed by the same method that is currently used such as a vacuum deposition method or a sputtering method.

The anchor layer 9 is, in FIG. 1 for example, provided to bind the hologram layer 7 provided with the transparent deposition layer 8 formed on the surface thereof with the receptor layer 5. As materials used for the production of the anchor layer 9, conventionally known materials may be used and there is no particular limitation to the material used for the anchor layer 9. Also, the anchor layer 9 may be formed by the same method that is currently used.

The ultraviolet absorbing layer 15 may be formed at an appropriate position between the receptor layer 5 and the substrate film 2 as a part of the transfer portion 12 as required. The receptor layer 5 after being transferred is coated with the ultraviolet absorbing layer to protect the printed product from ultraviolet rays among natural light thereby preventing the deterioration of the image 6 of the printed product. As materials used for the production of the ultraviolet absorbing layer, conventionally known materials may be used and there is no particular limitation to the material used for the ultraviolet absorbing layer. Also, the ultraviolet absorbing layer may be formed by the same method that is currently used.

The peelable layer 3 is usually formed of a mixture of an acrylic skeleton resin, a vinyl chloride-vinyl acetate copolymer, cellulose acetate and a heatcurable acrylic resin, melamine resin, nitrocellulose resin and polyethylene wax or the like. It is preferable to use an acrylic skeleton resin as a major component. A polyester resin or the like is preferably used to regulate the adhesive strength between the peelable layer 3 and the substrate film 2.

The peelable layer 3 may be formed, for instance, by dissolving or dispersing an acrylic skeleton resin and a polyester resin in an adequate solvent to prepare a coating solution for peelable layer and by applying the coating solution to the substrate film 2 by a gravure method, screen printing method or reverse coating method using a gravure plate, followed by drying. The thickness of the dried peelable layer 3 is usually 0.1 to 10 μm.

Even in the transfer portion 12 which is not provided with the peelable layer 3, adequate adhesive strength between the protect layer 4 and the substrate film 2 can be maintained by providing the protective layer 4 with a peeling ability. Even in the transfer portion 12 which is not provided with the protect layer 4, the same function as that of the peelable layer can be given by providing a layer facing the substrate film 2 with a peeling ability.

A release layer (not shown) may be formed on the substrate film 2 in place of the above peelable layer 3 and is usually formed of a binder resin and a releasing material. Given as examples of materials which may be used as the binder resin are thermoplastic resins including: acrylic type resins such as polymethyl methacrylate, polyethyl methacrylate and polybutyl acrylate; vinyl type resins such as polyvinyl acetate, vinyl chloride-vinyl acetate copolymers, polyvinyl alcohol and polyvinylbutyral; and cellulose derivatives such as ethyl cellulose, nitrocellulose and cellulose acetate. Examples of the materials for the binder resin also include heatcurable resins such as unsaturated polyester resins, polyester resins, polyurethane resins and aminoalkyde resins. As a releasing material, waxes, silicone wax, silicone type resins, melamine resins, fluororesins, micropowders of talc or silica, lubricants such as surfactants or metal soaps may be used.

The release layer may be formed by dissolving or dispersing the above resin in an adequate solvent to prepare a coating solution for release layer and by applying the coating solution to the substrate film 2 by a gravure printing method, screen printing method or reverse coating method using a gravure plate, followed by drying. The thickness of the dried release layer is usually 0.1 to 10 μm.

Next, the transfer-receiving material 16 will be explained. The aforementioned transfer portion 12 of the intermediate transfer recording medium is transferred to the transfer-receiving material 16 with the result that the printed product 17 is obtained. There is no particular limitation to a material used for the transfer-receiving material 16 to which the intermediate transfer recording medium of the present invention is applied. For instance, any of natural fiber paper, coated paper, tracing paper, plastic films which are not deformed by heat of the transfer process, glass, metals, ceramics, wood and fabrics may be used.

The transfer-receiving material 16 is not limited in its shape and application and may be used in the following applications: notes such as stock certificates, bills, bonds, passbooks, tickets, horse and vehicle betting tickets, stamps, postage stamps, tickets for appreciation, admission tickets and tickets; cards such as cash cards, credit cards, prepaid cards, member's cards, greeting cards, postcards, calling or business cards, driver licenses, IC cards and optical cards; cases such as cartons and containers; bags; documents and journals; envelopes; tags; OHP sheets; slide films; book marks; calendars; posters; pamphlets; menus; passports; POP articles; coasters; displays; name plates; key boards; cosmetics; accessories such as wrist watches and lighters; stationery materials such as writing materials and report papers; construction materials; panels; emblems; keys; fabrics; clothes; foot wears; radios; televisions; electric calculators; equipment such as OA equipment; various sample books; albums; or output tools for computer graphics and medical images.

Particularly, if the intermediate transfer recording medium having the transfer portion 12 provided with microcharacters, a lathe or scroll work-pattern and a fluorescent latent image is used in the case where a full-colored photograph of face and other necessary particulars are transferred to a passport for which a high resolution and high quality image are required, forgery and falsification can be prevented. The intermediate transfer recording medium according to the first aspect of the present invention is preferably used for the production of printed products for which high reliability and safety are required.

Figure 9:
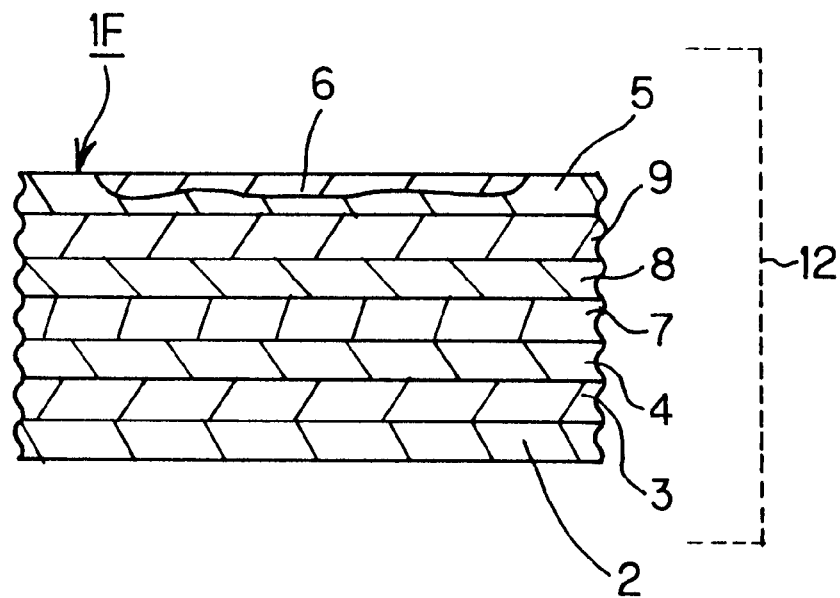
FIG. 9 is an illustrative sectional view showing an example of an intermediate transfer recording medium according to a second aspect of the present invention.

FIG. 9 is a sectional view showing an example of an intermediate transfer recording medium according to a second aspect of the present invention. An intermediate transfer recording medium 1F is a sheet-like laminate material consisting of a substrate film 2 and a transfer portion 12 which is formed on the substrate film 2 in a peelable manner. The transfer portion 12 has a multi-layer structure provided with at least a receptor layer 5 to which an image is to be transferred. In the transfer portion 12, a peelable layer 3, a protect layer 4, a hologram layer 7, a transparent deposition layer 8, an anchor layer 9 and the receptor layer 5 are laminated in this order from the side close to the substrate film 2. This intermediate transfer recording medium 1F is used to transfer the transfer portion 12, on which an image 6 has been formed, to a transfer-receiving material.

When the transfer portion 12 is transferred to the transfer-receiving material, the peeling strength allowing the transfer portion 12 to separate from the substrate film 2 is preferably 10 to 150 gf/inch and particularly preferably 30 to 100 gf/inch.

The peeling of the transfer portion 12 from the substrate film 2 usually arises at the boundary between the transfer portion 12 and the substrate film 2 or at the boundary between the peelable layer 3 and the substrate film 2 when the peelable layer 3 is formed. When the peelable layer 3 is formed, alternatively, layers such as the receptor layer 5, which must be transferred may be transferred to the transfer-receiving material by utilizing the cohesive failure of the peelable layer 3. The peeling strength in the present invention means such strength required for peeling, that is, any one of the strength required to peel the transfer portion 12 at the boundary between the transfer portion 12 and the substrate film 2 and the strength required to separate the peelable layer 3 by cohesive failure. A discussion will hereinafter be followed on the premise that the peeling arises at the boundary between the transfer portion 12 and the substrate film 2, namely at the boundary between the peelable layer 3 and the substrate film 2 as far as it is not otherwise noted. However, the same effect is obtained in the case of the cohesive failure of the peelable layer 3.

When the peeling strength is less than 10 gf/inch, the transfer portion 12 is easily peeled from the substrate film 2 and hence a better efficiency in transferring to the transfer-receiving material is obtained. However, in a transfer step, it is hard to cut neatly (namely, difficult layer-cuttability) the transfer portion 12 at the boundary between the portion to be transferred and the portion whose transfer is not required. As a result, the transferred portion is accompanied by a part of the transfer portion 12 whose transfer is not required, causing transfer failures such as tail-extension or burr. Moreover, the tail-extended portion and the burred portion fall down from the printed product during conveyance in the printer and adhere to products which are thereafter conveyed, causing product failures such as dusty products.

When the peeling strength exceeds 150 gf/inch, the layer-cuttability is improved. However, the transfer portion 12 cannot be easily peeled from the substrate film 2 and hence the efficiency in transferring the transfer portion is impaired and the transfer receiving material to be subjected to transfer is broken and torn by the side of the intermediate transfer recording medium 1, causing transfer failures, what is called, peeling of the surface of the transfer-receiving material and chips of the transfer-receiving material.

Accordingly, the peeling strength required to peel the transfer portion 12 from the substrate film 2 is limited to 10–150 gf/inch. This makes it possible to transfer the transfer portion 12 including the receptor layer 5 to the transfer-receiving material without impairing the transfer efficiency and without transfer failures as mentioned above.

Except the receptor layer 5, layers provided in the transfer portion 12, for example, the release layer 3, the protect layer 4, the hologram layer 7, and the anchor layer 9 are not necessarily essential layers and are respectively formed by adequate selection according to, for instance, the quality of the transfer-receiving material and the purpose and working condition of the resulting printed product. No particular limitation is imposed on these layers. However, corresponding to recent various needs, any one or more of these layers are formed appropriately to constitute the transfer portion 12 with multi-layers. It is to be noted that in place of these layers or in addition to these layers, other layers having a particular function, for example, an ultraviolet absorbing layer may be formed based on adequate selection.

If other than the receptor layer 5, various layers are formed as a part of the transfer portion 12 corresponding to each object, the thickness of the transfer portion 12 is increased more greatly than in a conventional case. This imposes the problem of difficult cuttability of the transfer portion 12 which has not been taken into account so far. On the contrary, in the present invention, since the peeling strength required to peel the transfer portion 12 from the substrate film 2 is designed to be 10 to 150 gf/inch in consideration of a variation in the thickness of the transfer portion and the transfer efficiency, the transfer can be made with high layer-cuttability.

The transfer portion 12 is, as shown in FIG. 9, usually peeled from the substrate film 2 at the boundary between the peelable layer 3 formed on the facemost surface of the transfer portion 12 at the side of the substrate film 2 (namely, the position closest to the substrate film 2) and the substrate film 2.

The peelable layer 3 is usually formed of an acrylic skeleton resin. Given as examples of the acrylic skeleton resin are polymethacrylate, polyacrylate, polyacrylnitrile and sodium polyacrylate.

It is desirable that a polyester resin is contained in the peelable layer 3 to regulate the peeling strength required to peel the transfer portion 12 from the substrate film. The polyester resin can serve to control the peeling strength between the substrate film 2 and the peelable layer 3 and also the strength of cohesive failure of the peelable layer 3.

To design the peeling strength to be 10 to 150 gf/inch, the polyester resin is preferably contained in a content of 3 to 10 parts by weight in 100 parts by weight of the acrylic skeleton resin.

The polyester resin, when it is contained in the acrylic skeleton resin, can control the peeling strength between the peelable layer 3 and the substrate film 2 and can hence easily control the peeling strength, when the transfer portion 12 is transferred, in the aforementioned range.

If the content of the polyester resin is less than 3 parts by weight based on 100 parts by weight of the acrylic skeleton resin, there is the case where the peeling strength defined in the above range is made smaller than 10 gf/inch when other than the receptor 5, multi-layers are formed in the transfer portion 12 whereby the thickness of the transfer portion 12 is thick. There is the possibility that transfer failures can not be prevented sufficiently. On the other hand if the content of the polyester resin exceeds 10 parts by weight based on 100 parts by weight of the acrylic skeleton resin, the adhesive strength between the peelable layer 3 and the substrate film 2 becomes too large and hence there is the case where the peeling strength defined in the above range exceeds 150 gf/inch. There is the possibility of transfer failures, that is, peeling and chips of paper. Therefore, the content of the polyester resin is preferably limited to a range between 3 and 10 parts by weight based on 100 parts by weight of the acrylic skeleton resin.

The second aspect of the present invention enables it possible to transfer the transfer portion 12 without any transfer failure even when the transfer portion is made into multi-layers and the thickness thereof becomes larger than 3 μm. The following relation is established between the thickness of the transfer portion 12 and peeling strength.

When the thickness of the transfer portion 12 containing two or more layers including at least a receptor layer is in a range between 3 and 5 μm, the peeling strength of the transfer portion is preferably in a range between 10 and 50 gf/inch. The peeling strength in the above range enables the transfer portion 12 with the above thickness to be layer-cut thoroughly. To obtain the peeling strength in the above range, the polyester resin is preferably contained in an amount of 3 to 4 parts by weight based on 100 parts by weight of the acrylic skeleton resin.

When the thickness of the transfer portion 12 is in a range between 5 and 10 μm, the peeling strength of the transfer portion is preferably in a range between 50 and 100 gf/inch. When the peeling strength is in the above range, the transfer portion 12 with the above thickness is layer-cut thoroughly. The polyester resin is preferably contained in an amount of 4 to 6 parts by weight based on 100 parts by weight of the acrylic skeleton resin to obtain the peeling strength falling in the above range.

When the thickness of the transfer portion 12 is in a range between 10 and 20 μm, the peeling strength of the transfer portion is preferably in a range between 100 and 150 gf/inch. When the peeling strength falls in the above range, the transfer portion 12 with the above thickness is layer-cut thoroughly. The polyester resin is preferably contained in an amount of 6 to 10 parts by weight based on 100 parts by weight of the acrylic skeleton resin to obtain the peeling strength falling in the above range.

If the relation between the thickness of the transfer portion 12 and peeling strength and the content of each component for providing prescribed peeling strength are designed to be in the above ranges, tail-extension, burr and failures in layer cuttability which are caused by excessively small peeling strength are not produced and peeling and chips of paper which are caused by large peeling strength are not produced even in the transfer portion 12 which has a multilayer structure and a thickness more than 3 μm.

The peelable layer 3 may be formed, for instance, by dissolving or dispersing each prescribed amount of an acrylic skeleton resin and a polyester resin in an adequate solvent to prepare a coating solution for peelable layer and by applying the coating solution on the substrate film 2 by a gravure printing method, screen printing method or reverse coating method using a gravure plate, followed by drying. The thickness of the peelable layer 3 after it is dried is usually 0.1 to 10 μm.

Even in the transfer portion 12 provided with no peelable layer 3, adequate peeling strength as aforementioned is provided between the protect layer 4 and the substrate film 2 by providing the protect layer 4 with a peeling ability. Also, even in the transfer portion 12 provided with no protect layer 4, the same function as aforementioned can be given by providing a layer facing the substrate film 2 with a peeling ability.

Figure 10:
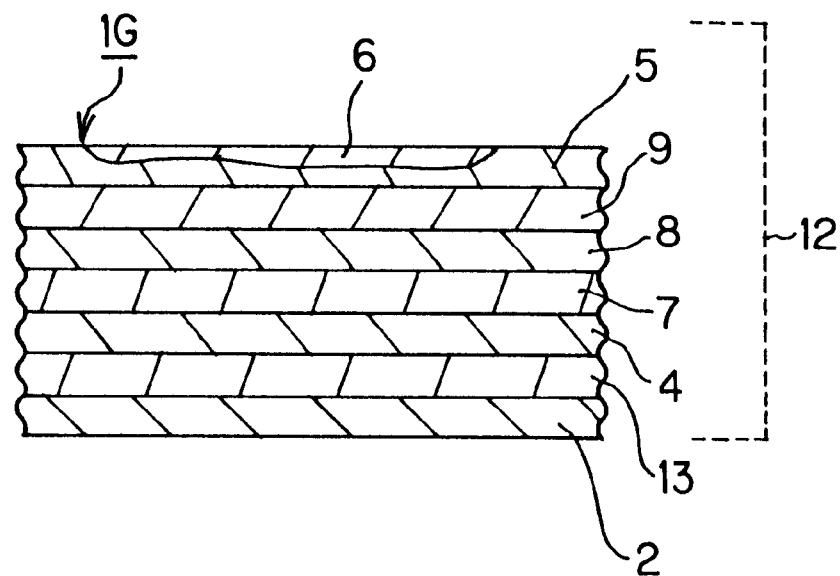
FIG. 10 is an illustrative sectional view showing another example of an intermediate transfer recording medium according the second aspect of the present invention.

FIG. 10 is a sectional view showing another example of an intermediate transfer recording medium according the second aspect of the present invention. An intermediate transfer recording medium 1G comprises a substrate film 2, a release layer 13 provided on the substrate film 2 and a transfer portion 12 provided on the release layer 13. The transfer portion 12 has a multilayer structure comprising at least a receptor layer 5 to which an image 6 is to be transferred. In the transfer portion 12, a protect layer 4, a hologram layer 7, a transparent deposition layer 8, an anchor layer 9 and the receptor layer 5 are laminated in this order from the side close to the substrate film 2.

The intermediate transfer recording medium 1G is, unlike the intermediate transfer recording medium 1F shown in FIG. 9, provided with the release layer 13 on the outermost surface of the substrate film 2 at the side of the transfer portion 12 instead of providing the peelable layer 3 on the outermost surface of the transfer portion 12 at the side of the substrate film 2.

In this case, as shown in FIG. 10, the peeling of the transfer portion 12 from the substrate film 2 arises at the boundary between the protect layer 4 formed on the outermost surface of the transfer portion 12 at the side of the substrate film 2 and the release layer 13 formed on the outermost surface of the substrate film 2 at the side of the transfer portion 12. The peeling in this case can be achieved by the same effect as aforementioned, that is, the transfer portion 12 formed on the substrate film 2 can be peeled from the interface between itself and the release layer 13 by a peeling strength of 10 to 150 gf/inch. It is hence possible to make the transfer free from transfer failures such as tail-extension and chips. In this case, the peeling strength between the transfer portion 12 and the release layer 13 is controlled in a range between 10 and 150 gf/inch.

The release layer 13 is usually formed of a binder resin and a releasing material. Given as examples of materials which may be used as the binder resin are thermoplastic resins including: acrylic resins such as polymethyl methacrylate, polyethyl methacrylate and polybutyl acrylate; vinyl type resins such as polyvinyl acetate, vinyl chloride-vinyl acetate copolymers, polyvinyl alcohol and polyvinyl butyral; and cellulose derivatives such as ethyl cellulose, nitrocellulose and cellulose acetate. Examples of the binder resin for the release layer further include heat-curable resins such as unsaturated polyester resins, polyester resins, polyurethane resins and aminoalkyde resins. As the releasing material, waxes, silicon wax, silicone type resins, melamine resins, fluororesins, micropowders of talc or silica, or lubricants such as surfactants or metal soaps may be used.

The aforementioned peeling strength can be controlled by regulating the content of the releasing material in the release layer.

The release layer 13 may be formed, for instance, by dissolving or dispersing the above resin in an adequate solvent to prepare a coating solution for release layer and by applying the coating solution to the substrate film 2 by a gravure printing method, screen printing method or reverse coating method using a gravure plate, followed by drying.

The thickness of the release layer 13 after it is dried is usually 0.1 to 10 μm.

Next, each layer constituting the intermediate transfer recording medium according to the second aspect of the present invention will be explained.

As the substrate film 2, there may be used the same substrate film that is used for a conventional intermediate transfer recording medium as it is and there is no limitation to a material of the substrate film 2. Given as specific examples of materials used preferably as the substrate film 2 are thin paper such as glassine paper, condenser paper or paraffin paper; or oriented or nonoriented films of plastics such as highly heat resistant polyesters (e.x., polyethylene terephthalate, polyethylene naphthalate, polybutylene terephthalate, polyphenylene sulfide, polyether ketone or polyether sulfone), polypropylene, polycarbonate, cellulose acetate, polyethylene derivatives, polyvinyl chloride, polyvinylidene chloride, polystyrene, polyamide, polyimide, polymethylpentene or ionomers. Also, composite films produced by laminating two or more of these materials may be used. The thickness of the substrate film 2 may be adequately selected depending upon the type of material such that appropriate strength and heat resistance of the material can be obtained. Usually, a substrate film having a thickness of 1 to 100 μm is preferably used.

The peeling strength between the substrate film 2 and the transfer portion 12 differs depending upon the surface condition of the substrate film 2. In this case, the peeling strength is controlled by regulating the composition and content of materials contained in the transfer portion 12.

A rear layer may be formed as required on the surface of the substrate film 2 on the opposite side of the transfer portion 12. The rear layer may be provided by using the same resin that is currently used to prevent the fusion of the substrate film 2 and a heating device, such as a thermal head, and to improve the slidability when the transfer portion 12 is transferred to the transfer-receiving material by using the intermediate transfer recording medium.

The receptor layer 5 is provided, as a part of the transfer portion 12 constituting the intermediate transfer recording medium, on the outermost surface on the opposite side of the substrate film 2. On the receptor layer 5, the image 6 is thermally transferred from a thermal transfer sheet provided with a colorant layer by a thermal transfer method. The transfer portion 12 of the intermediate transfer recording medium 1F or 1G on which the image 6 has been formed is transferred to the transfer-receiving material, and as a result, a printed product is formed.

In light of this, as materials for forming the receptor layer 5, conventionally well-known resin materials which easily accept colorants such as sublimation dyes or heat-meltable inks may be used. Examples of materials used for the receptor layer 5 include: polyolefin type resins such as polypropylene; halogenated resins such as polyvinyl chloride and polyvinylidene chloride; vinyl type resins such as polyvinyl acetate, vinyl chloride-vinyl acetate copolymers, ethylene-vinyl acetate copolymers or polyacrylates; polyester resins such as polyethylene terephthalate or polybutylene terephthalate; polystyrene type resins; polyamide type resins; copolymer type resins obtained by polymerizing an olefin such as ethylene or propylene with other vinyl polymers; ionomers; cellulose type resins such as cellulose diastase and polyearbonate. Particularly, vinyl chloride type resins, acryl-styrene type resins or polyester type resins are preferable.

When the receptor layer 5 is transferred to and laminated on the transfer-receiving material through an adhesive layer, the adhesion of the receptor layer 5 is not necessarily required. However, when the receptor layer 5 is laminated on the transfer-receiving material without interposing an adhesive layer, it is desirable to form the receptor layer 5 by using an adhesive resin material such as vinyl chloride-vinyl acetate copolymers.

The receptor layer 5 is formed by the following method. A single material or plural materials selected from the above materials are blended, to which various additives are added as required. The resulting mixture is dissolved or dispersed in an adequate solvent such as water or an organic solvent to prepare a coating solution for receptor layer. The coating solution is applied to the substrate film 2 or to the protect layer 4 or the like, if the protect layer 4 or the like is formed, by a gravure printing method, screen printing method or reverse coating method using a gravure plate, followed by drying. The thickness of the receptor layer 5 is about 1 to 10 μm in dry condition.

The protect layer 4 is provided as a part of the transfer portion 12 if necessary. The receptor layer 5 is coated with the protect layer 4 after the transfer portion 12 is transferred to the transfer-receiving material to maintain the qualities of the image 6. As materials used to form the protect layer 4, conventionally known materials for the protect layer may be used. It is desirable to select a resin composition having desired properties, for instance, fingerprint resistance, required for a surface protect layer. When, specifically, wear resistance, chemical resistance and staining resistance are required, an ionizing radiation hardenable resin may be used as the resin for protect layer. The protect layer 4 may be formed by using materials for protect layer to which lubricants for improving the abrasion resistance of the image-formed products, surfactants for protecting from staining, ultraviolet absorbers for improving weather resistance and antioxidants are added appropriately. Also, as stated above, in the case where no peeling layer 3 is formed, the structural components of the protect layer are regulated such that the peeling strength required to peel the transfer portion 12 from the substrate film 2 should be in the above range, thereby controlling the adhesion between the protect layer 4 and the substrate film 2.

The protect layer 4 can be formed in the same method that is used to form the peelable layer 3. The thickness of the protect layer 4 is preferably 0.1 to 10 μm.

The hologram layer 7 is provided as a part of the transfer portion 12 as required. The receptor layer 5 is coated with the hologram layer 7 after the transfer portion 12 is transferred to the transfer-receiving material, thereby obtaining a printed product which accompanies a hologram pattern. The printed product provided with the hologram pattern has a decorative effect and is forged by copying with difficulty. It is therefore preferably used for those requiring security such as credit cards and passports. As materials used for the production of the hologram layer 7, conventionally known materials may be used and there is no particular limitation to the material used for the hologram layer 7. Also, the hologram layer 7 may be formed by the same method that is currently used.

The transparent deposition layer 8 is usually formed in contact with the hologram layer 7 on the side close to the receptor layer 5. Because this transparent deposition layer 8 has a refractive index differing from those of other layers, it has the effect of embossing the pattern of the hologram in the formed printed product. As materials for forming the transparent deposition layer 8, conventionally well-known materials, for example, metal oxides or sulfides such as ZnS, $TiO_2$, $SiO_2$ and $Cr_2O_3$ may be used though there is no particular limitation to the material of the transparent deposition layer 8. Also, the transparent deposition layer 8 may be formed by the same method that is currently used such as a vacuum deposition method or a sputtering method.

The anchor layer 9 is, in FIG. 10 for example, provided to adhere the hologram layer 7 provided with the transparent deposition layer 8 on its surface with the receptor layer 5. As materials used for the production of the anchor layer 9, conventionally known materials may be used and there is no particular limitation to the material used for the anchor layer 9. Also, the anchor layer 9 may be formed by the same method that is currently used.

The ultraviolet absorbing layer may be formed at an appropriate position between the receptor layer 5 and the substrate film 2 as a part of the transfer portion 12 as required. The receptor layer 5 after being transferred is coated with the ultraviolet absorbing layer to protect the printed product from ultraviolet rays among natural light thereby preventing the deterioration of the image 6 of the printed product. As materials used for the production of the ultraviolet absorbing layer, conventionally known materials may be used and there is no particular limitation to the material used for the ultraviolet absorbing layer. Also, the ultraviolet absorbing layer may be formed by the same method that is currently used.

In addition, it is preferable to provide an alignment detection mark on the intermediate transfer recording medium to transfer the transfer portion 12 of the intermediate transfer recording medium 1F or 1G to a designated position of the transfer-receiving material or to transfer the image 6 to the receptor layer 5 of the transfer portion 12 by using a thermal transfer sheet without misregistration and color shift.

The detection mark may have any form as far as it can be recognized optically. For instance, a well-known detection mark, for example, a print mark or a though-hole each having a circular, rectangular or line form may be formed. The print detection mark may be formed one or more places of one surface of the substrate film 2 of the intermediate transfer recording medium 1F or 1G by using a well-known printing method or the like. When the detection mark is formed by printing, the ink to be used may be those which are conventionally used and there is no particular limitation to the ink material.

The transfer portion 12 of the intermediate transfer recording medium 1F or 1G according to the above second aspect is transferred to the transfer-receiving material, and as a result, a printed product is obtained. Like the first aspect, no particular limitation is imposed on the transfer-receiving material to which the intermediate transfer recording medium according to the second aspect of the present invention is applied. Also, the types of shape and application of the transfer-receiving material may be optional.

The intermediate transfer recording medium according to the second aspect of the present invention can be utilized to make a passport like the intermediate transfer recording medium according to the first aspect. If the intermediate transfer recording medium 1F or 1G according to the second aspect in which the peeling strength of the transfer portion 12 is regulated is used in the case where a full-colored photograph of face and other necessary particulars are transferred to a passport for which a high resolution and high quality image are required, no transfer failure is caused and a printed product which has a high quality image free from partial chips and peeling is obtained.

As explained above, if the intermediate transfer recording medium according to the first aspect of the present invention is used, an image can be formed at a predetermined position of the receptor layer by detecting the hologram mark allocated to each hologram pattern in the transfer portion of the intermediate transfer recording medium. Hence, the image is not formed on the joint between the hologram patterns and hence a high quality printed product can be obtained. Also, the hologram mark can be formed in the same step with the hologram pattern, which is preferable from the productive point of view. Moreover, because this hologram mark functions as a mark for setting the position of the transfer portion to be transferred to the transfer-receiving material when the transfer portion is transferred to the transfer-receiving material, a necessary part of the transfer portion can be transferred exactly to a predetermined position of the transfer-receiving material and an image existing originally on the transfer-receiving material can be well-matched with an image existing on the transfer portion. Therefore this intermediate transfer recording medium is preferable to obtain a printed product free from misregistration and the like.

According to the first method for forming a printed product according to the first aspect of the present invention, a hologram mark is allocated to each hologram pattern formed on the intermediate transfer recording medium and the position where an image is formed is set by detecting the hologram mark when the image is formed on the intermediate transfer recording medium. Hence, the image can be exactly formed at a predetermined position. Also when the transfer portion is transferred to the transfer-receiving material, the position of the transfer portion to be transferred is set by detecting the hologram mark. Therefore, a necessary part of the transfer portion can be exactly transferred to a predetermined position of the transfer-receiving material and an image existing originally on the transfer-receiving material can be well-matched with an image existing on the transfer portion with the result that a printed product free from misregistration and the like can be obtained.

According to the second method for forming a printed product according to the first aspect of the present invention, a hologram mark is allocated to each hologram pattern formed on the intermediate transfer recording medium. When an image is formed on the intermediate transfer recording medium, the hologram mark is detected to form a colored detection mark firstly and the position where an image is thereafter formed is set by using this colored detection mark as a reference detection mark. The image can be formed more exactly at a predetermined position of the receptor layer. Also, when the transfer portion is transferred to the transfer-receiving material, the position of the transfer portion to be transferred is set by detecting the colored detection mark. An image formed on the transfer-receiving material can be thereby well-matched with the image formed on the transfer portion with the result that a printed product free from misregistration and the like can be obtained.

According to the first aspect of the present invention, a passport with high printing accuracy can be obtained. The obtained passport is remarkably reduced in color shift and misregistration in particulars for identification, for instance, a photograph of face, a name, nationality and a signature and in micro-characters and lathe or scroll work-pattern for preventing forgery and falsification and the like Furthermore, the joints formed in the production of a plate for a hologram do not appear in the passport.

On the other hand, in the case of using the intermediate transfer recording medium according to the second aspect of the present invention, the peeling strength required to peel the transfer portion from the substrate film is adjusted to 10 to 150 gf/inch when the transfer portion formed with an image is transferred to the transfer-receiving material. Therefore, tail-extension and burr which arise when the peeling strength of the transfer portion is too small are not produced and peeling and chips of paper which arise when the peeling strength is too large are not produced.

EXAMPLES

Experimental examples will be hereinafter explained.

Example A Series

Example A1

Firstly, a transparent polyethylene terephthalate with a thickness of 12 μm was used as a substrate film 2, the coating solution for peelable layer shown below was applied to the substrate film and dried to form a peelable layer 3 with thickness of 1.5 μm on the substrate film 2.

<Coating solution for peelable layer>
Acrylic resin: 40 parts by weight
Polyester resin: 2 parts by weight
Methyl ethyl ketone: 50 parts by weight
Toluene: 50 parts by weight Next, the coating solution for hologram layer shown below was applied to the above peelable layer 3 and dried to form a hologram layer 7 with thickness of 2.0 μm. The formation of a hologram pattern 21 on the hologram layer 7 was performed by forming fine unevenness by embossing processing with the use of an original plate provided with an irregular pattern of interference fringes of a hologram. In addition, a hologram mark 22 was formed by means of the above original plate for embossing process at the same time when the hologram pattern 21 was formed.

<Coating solution for hologram layer>
Acrylic resin: 40 parts by weight
Melamine resin: 10 parts by weight
Cyclohexane: 50 parts by weight
Methyl ethyl ketone: 50 parts by weight Furthermore, a titanium oxide with thickness of 500 angstrom was formed as a transparent deposition layer 8 on the above hologram layer 7, formed with the hologram mark 22 and the hologram pattern 21, by a vacuum deposition method. The coating solution for receptor layer shown below was further applied to the transparent deposition layer 8 and dried to form a receptor layer 5 with 2.0 μm thickness, thereby producing an intermediate transfer recording medium of Example A1 provided with the hologram mark 22.

<Coating solution for receptor layer>
Vinyl chloride-vinyl acetate copolymer: 40 parts by weight
Acrylic silicone: 1.5 parts by weight
Methyl ethyl ketone: 50 parts by weight
Toluene: 50 parts by weight An image 6 was formed on the receptor layer 5 of the obtained intermediate transfer recording medium by a thermal transfer method using a thermal transfer sheet in which each colorant layer of yellow, magenta and cyan was alternately provided side by side. The position where the image 6 was formed was set by detecting the position of the hologram mark 22 by means of a semiconductor laser and a photosensor.

Example A2

The intermediate transfer recording medium obtained in the above Example A1 was used. Firstly a colored detection mark was transferred to and formed on the receptor layer 5 of the intermediate transfer recording medium by a thermal transfer method using a thermal transfer sheet in which each colorant layer of yellow, magenta and cyan and a colorant layer 78 for colored detection mark was alternately provided side by side. The colorant layer for colored detection mark was a heat-meltable black ink layer. The position where the colored detection mark was formed was set by detecting the hologram mark 22 formed on the hologram layer of the intermediate transfer recording medium in the same manner as in Example A1.

In succession, each colorant of yellow, magenta and cyan was transferred to form an image 6 on the receptor layer 5 of the intermediate transfer recording medium. The position where the image was formed was set by detecting the colored detection mark formed on the receptor layer 5 by means of a transmission type sensor.

Comparative Example A1

In the same process of Example A1, when the hologram pattern 21 was formed, an intermediate transfer recording medium which formed no hologram mark 22 was made. A detection mark was formed by printing on a receptor layer 5 of the resulting intermediate transfer recording medium.

The positions where the detection marks were formed were set by mechanical feed so as to have the same pitch as the pattern pitch of the hologram pattern.

Next, an image 6 was formed on the receptor layer 5 of the intermediate transfer recording medium by a thermal transfer method using a thermal transfer sheet in which each colorant layer of yellow, magenta and cyan was alternately provided side by side. The position where the image 6 was formed was set by detecting the detection mark, formed by printing, by means of a transmission type sensor.

Comparative Example A2

In the same process of Example A1, when the hologram pattern 21 was formed, an intermediate transfer recording medium which formed no hologram mark 22 was made.

No detection mark was formed on the intermediate transfer recording medium. An image 6 was formed on the receptor layer 5 of the intermediate transfer recording medium by a thermal transfer method using a thermal transfer sheet in which each colorant layer of yellow, magenta and cyan was provided.

Evaluation of the Example A Series and Results

In Examples A1, A2 and Comparative Examples A1, A2, each degree of difficulty in the formation of various detection marks used to form an image on the intermediate transfer recording medium was evaluated. The degree of difficulty was determined in consideration of actual difficulty in the formation of the detection mark, and classified into as follows: "⊚": easy to form, "○": average to form, "X": difficult to form.

Next, each degree of difficulty in the reading when various detection marks formed were read by a sensor was evaluated. The degree of difficulty in the reading of the detection mark was determined with reference to the criterion whether it could be easily detected by the sensor or not, and by further taking frequency of adjustment of the sensor for perfect detection of the detection mark into account, and thus classified into as follows: "⊚": easy to read, "○": average to read, "X": difficult to read.

Further, whether or not the image formed on the intermediate transfer recording medium appeared on the joints between the hologram marks 21 was evaluated. Moreover, accuracy of the formation position, that is, whether or not an image was formed at the position where it was to be formed was evaluated. The results were classified into as follows: "⊚": an image is formed with high accuracy at the position where it is to be formed, "○": an image is formed exactly as a rule at the position where it is to be formed, "X": an image is not formed at the position where it is to be formed.

The results obtained are shown in Table 1 as FIG. 13. In all of Examples A1, A2, good results were obtained. Particularly in the case of the hologram mark, it was easily formed and high positional accuracy was obtained in the formation of an image. In the case of the colored detection mark, it was easily read since a transmission type sensor could be used.

On the other hand, in the case of the detection mark formed by printing, its formation was complicated because it had to be printed in a separate step. As a consequence, the detection mark could not be formed with accuracy and only low positional accuracy was obtained in the formation of an image.

Example B Series

Example B1

Firstly, a transparent polyethylene terephthalate with a thickness of 12 μm was used as a substrate film 2 and the coating solution for peelable layer shown below was applied to the substrate film and dried to form a peelable layer 3 with thickness of 1.5 μm on the substrate film 2.

<Coating solution for peelable layer>
Acrylic resin: 100 parts by weight
Polyester resin: 5 parts by weight
Methyl ethyl ketone: 100 parts by weight
Toluene: 100 parts by weight Next, the coating solution for hologram layer shown below was applied to the above peelable layer 3 and dried to form a hologram layer 7 with thickness of 2.0 μm.

<Coating solution for hologram layer>
Acrylic resin: 40 parts by weight
Melamine resin: 10 parts by weight
Cyclohexane: 50 parts by weight
Methyl ethyl ketone: 50 parts by weight Furthermore, a titanium oxide with thickness of 500 angstrom was formed as a transparent deposition layer 8 on the above hologram layer 7 by a vacuum deposition method. The coating solution for receptor layer shown below was further applied to the transparent deposition layer 8 and dried to form a receptor layer 5 with thickness of 2.0 μm, thereby producing an intermediate transfer recording medium of Example B1. The transfer portion 12 of the resulting intermediate transfer recording medium was a laminate of the peelable layer 3, the hologram layer 7, the transparent deposition layer 8 and the receptor layer 5. The thickness of the laminate was 5.55 μm.

<Coating solution for receptor layer>
Vinyl chloride-vinyl acetate copolymer: 40 parts by weight
Acrylic silicone: 1.5 parts by weight
Methyl ethyl ketone: 50 parts by weight
Toluene: 50 parts by weight

Example B2

In the above Example B1, the coating solution for peelable layer was altered to the composition shown below to form a peelable layer 3 with a thickness of 1.5 μm.

<Coating solution for peelable layer>
Acrylic resin: 100 parts by weight
Polyester resin: 7.5 parts by weight
Methyl ethyl ketone: 100 parts by weight
Toluene: 100 parts by weight Next, on the resulting peelable layer 3, a hologram layer 7 with thickness of 3.0 μm, a titanium oxide deposition film with thickness of 500 angstrom as a transparent deposition layer 8 and a receptor layer 5 with thickness of 6.0 μm were sequentially formed in the same manner as in Example B1 to make an intermediate transfer recording medium of Example B2. The thickness of a transfer portion 12 was 10.55 μm.

Comparative Example B1

In the above Example B1, the coating solution for peelable layer was altered to the composition shown below to form a peelable layer 3 with a thickness of 1.5 μm.

<Coating solution for peelable layer>
Acrylic resin: 100 parts by weight
Polyester resin: 2.5 parts by weight
Methyl ethyl ketone: 100 parts by weight
Toluene: 100 parts by weight Next, on the resulting peelable layer 3, a hologram layer 7, a titanium oxide deposition film as a transparent deposition layer 8 and a receptor layer 5 were sequentially formed in the same thickness in the same manner as in Example B1 to make an intermediate transfer recording medium of Comparative Example B1. The thickness of a transfer portion 12 was 5.55 μm.

Comparative Example B2

In the above Example B2, the coating solution for peelable layer was altered to the composition shown below to form a peelable layer 3 with a thickness of 1.5 μm.

<Coating solution for peelable layer>
Acrylic resin: 100 parts by weight
Polyester resin: 5 parts by weight
Methyl ethyl ketone: 100 parts by weight Toluene: 100 parts by weight Next, on the resulting peelable layer 3, a hologram layer 7, an titanium oxide deposition film as a transparent deposition layer 8 and a receptor layer 5 were sequentially formed in the same thickness in the same manner as in Example B2 to make an intermediate transfer recording medium of Comparative Example B2. The thickness of a transfer portion 12 was 10.55 μm.

Comparative Example B3

In the above Example B1, the coating solution for peelable layer was altered to the composition shown below to form a peelable layer 3 with a thickness of 1.5 μm.

<Coating solution for peelable layer>
Acrylic resin: 100 parts by weight
Polyester resin: 20 parts by weight
Methyl ethyl ketone: 100 parts by weight
Toluene: 100 parts by weight Next, on the resulting peelable layer 3, a hologram layer 7, a titanium oxide deposition film as a transparent deposition layer 8 and a receptor layer 5 were sequentially formed in the same thicknesses in the same manner as in Example B1 to make an intermediate transfer recording medium of Comparative Example B3. The thickness of a transfer portion 12 was 5.55 μm.

Evaluation of Example B Series and Results

Figure 11A:
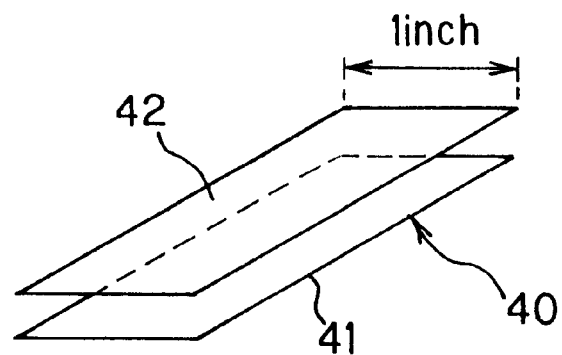
FIG. 11 is a view for explaining a peeling strength test using an intermediate transfer recording medium of the present invention.

These intermediate transfer recording medium obtained in Examples B1, B2 and Comparative Examples B1 to B3 were, as shown in FIG. 11(a), cut into a strip-shaped test piece 41 such that the test piece had a width of 1 inch. A test piece 42 made of a hard vinyl chloride sheet with the same size as the test piece 41 was heat-bonded to the receptor layer 5 of the test piece 41 to produce a test piece 40 for peeling test.

Figure 11B:
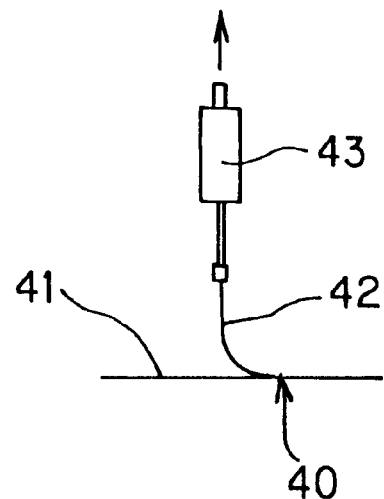
Figure 12:
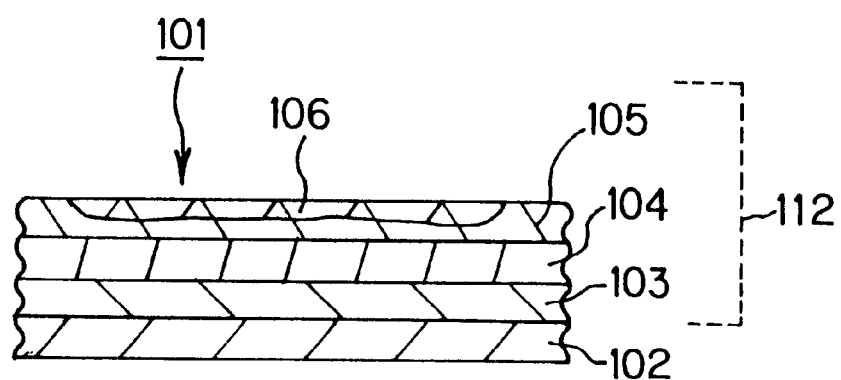
FIG. 12 is an illustrative sectional view showing the structure of a typical intermediate transfer recording medium.

As shown in FIG. 11(b), the test piece 41 was peeled from the test piece 42 to detect the strength produced between the substrate film 2 and the transfer portion 12 by means of a load cell thereby measuring peeling strength (gf/inch). The results obtained are shown in Table 2 as FIG. 14.

Next, an image 6 was formed on the receptor layer 5 of the intermediate transfer medium by a thermal transfer method using a thermal transfer sheet. The transfer portion on which the image had been formed was thermally transferred to natural fabric paper used as a transfer-receiving material to observe presence or absence of tail-extension, chips and paper peeling in the transfer step. The results were rated as follows: "○": all of those failures were not observed, "X": any one of those failures was observed. Here, the term "tail-extension" means the phenomenon that in the transfer of the transfer portion 12, the transfer portion 12 whose transfer is not required is partly transferred together on account of too-small peeling strength. The term "chips" means the phenomenon that a part of the transfer portion which should be transferred is left untransferred on the substrate film 2 on account of too-large peeling strength. The term "paper peeling" means the condition that the transfer-receiving material is torn by the side of the intermediate transfer recording medium on account of too large peeling strength and too-large adhesive strength between the transfer-receiving material and the transfer portion 12. The results obtained are shown in Table 2 as FIG. 14.

In Examples B1 and B2, adequate peeling strength was obtained in relation to the thickness of the transfer portion. Hence, a high transfer ability was obtained and tail-extension, chips and paper peeling were not produced.

In Comparative Example B1, on the other hand, the amount of the polyester was small and the peeling strength was thereby reduced, causing the production of tail-extension in the transfer step. In Comparative Example B2, the transfer portion was thick, causing difficult layer-cuttability and the production of tail-extension. In Comparative Example B3, the amount of the polyester was large and the peeling strength was thereby increased, leading to the production of chips and paper peeling.

What is claimed is:

1. An intermediate transfer recording medium comprising at least a substrate film and a transfer portion disposed on the substrate film to be peelable therefrom, the transfer portion having at least a receptor layer, on which an image is to be formed;

wherein the transfer portion is provided with plural hologram patterns with a hologram mark allocated to each hologram pattern;

wherein the intermediate transfer recording medium being a continuous sheet; and further comprising an end mark capable of causing light scattering being disposed at a terminative portion of the continuous sheet.

2. An intermediate transfer recording medium as claimed in claim 1 wherein the end mark is formed from a hologram.

3. An intermediate transfer recording medium comprising:

at least a substrate film and a transfer portion disposed on the substrate film to be peelable therefrom, the transfer portion having at least a receptor layer, on which an image is to be formed;

wherein a peeling strength required to peel the transfer portion from the substrate film when the transfer portion is transferred to a transfer-receiving material is in a range of 10 to 150 gf/inch; and wherein the transfer portion further comprises a peelable layer disposed at a facemost portion of a side near the substrate film, and the peelable layer comprises as a main component, a resin having an acrylic molecule structure, and contains a polyester resin at an amount in a range of 3 to 10 parts by weight to 100 parts by weight of the resin having an acrylic molecule structure.

4. An intermediate transfer recording medium as claimed in claim 3, wherein the transfer portion has a thickness of 3 μm or more.

5. An intermediate transfer recording medium as claimed in claim 4, wherein the transfer portion has a thickness in a range of not less than 3 μm and not more than 5 μm, and the peeling strength is in a range of not less than 10 gf/inch and not more than 50 gf/inch.

6. An intermediate transfer recording medium as claimed in claim 4, wherein the transfer portion has a thickness in a range of not less than 5 μm and not more than 10 μm, and the peeling strength is in a range of not less than 50 gf/inch and not more than 100 gf/inch.

7. An intermediate transfer recording medium as claimed in claim 4, wherein the transfer portion has a thickness in a range of not less than 10 μm and not more than 20 μm, and the peeling strength is in a range of not less than 100 gf/inch and not more than 150 gf/inch.

8. An intermediate transfer recording medium as claimed in any one of claims 3, 4–7 wherein the transfer portion is provided with a hologram layer and the hologram layer is positioned between the receptor layer and the substrate film.

9. A method of producing a printed product comprising the steps of:

providing an intermediate transfer recording medium comprising at least a substrate film and a transfer portion disposed on the substrate film to be peelable therefrom, the transfer portion having at least a receptor layer, on which an image is to be formed, wherein the transfer portion is provided with plural hologram patterns with a hologram mark allocated to each the hologram pattern;

providing a thermal transfer sheet provided with a colorant transferable portion;

setting a position at which an image is to be formed on the receptor layer by detecting the hologram mark, and then transferring a colorant from the colorant transferable portion of the thermal transfer sheet to the thus set position to form the image; and thereafter, setting a position of the transfer portion to be transferred to a transfer-receiving material by detecting the hologram mark, and then transferring the transfer portion of the thus set position on the transfer-receiving material to form the printed product.

10. A method of producing a printed product as claimed in claim 9, wherein the provided intermediate transfer recording medium is a continuous sheet, at a terminative portion of which an end mark capable of causing light scattering is disposed, and the terminative portion of the continuous sheet is indicated by detection of the end mark.

11. A method of producing a printed product as claimed in claim 11 or claim 10, wherein detection of the hologram mark or the end mark is carried out by diffracting or scattering light which is emitted from a light emitting element on the hologram mark or the end mark, and then detecting a diffracted light or a scattered light by a light receiving element.

12. A method of producing a printed product comprising the steps of:

providing an intermediate transfer recording medium comprising at least a substrate film and a transfer portion disposed on the substrate film to be peelable therefrom, the transfer portion having at least a receptor layer, on which an image is to be formed, wherein the transfer portion is provided with plural hologram patterns with a hologram mark allocated to each the hologram pattern;

providing a thermal transfer sheet provided with a colorant transferable portion;

setting a position at which a colored detection mark is to be formed on the receptor layer by detecting the hologram mark, and the transferring a colorant from the colorant transferable portion of the thermal transfer sheet to the thus set position to form the colored detection mark;

setting a position at which an image is to be formed on the receptor layer by detecting the colored detection mark, and then transferring a colorant from the colorant transferable portion of the thermal transfer sheet to the thus set position to form the image; and thereafter, setting a position of the transfer portion to be transferred to a transfer-receiving material by detecting the colored detection mark, and then transferring the transfer portion of the thus set position on the transfer-receiving material to form the printed product.

13. A method of producing a printed product as claimed in claim 12, wherein the colored detection mark is formed from a heat meltable ink.

14. A passport produced by the method of producing a printed product described in any one of claims 9 to 12.

15. An intermediate transfer recording medium comprising at least a substrate film and a transfer portion disposed on the substrate film to be peelable therefrom, the transfer portion having at least a receptor layer, on which an image is to be formed; wherein the transfer portion is provided with plural hologram patterns with a hologram mark allocated to each hologram pattern; and wherein the hologram mark being formed by the same manner as the hologram pattern with a constant relative positional relationship with respect to the hologram pattern.

16. An intermediate transfer recording medium according to claim 15, wherein the hologram pattern is formed to a portion to be transferred to a transfer-receiving material of the transfer portion and the hologram mark is formed to a portion not to be transferred to the transfer-receiving material of the transfer portion.

17. An intermediate transfer recording medium comprising at least a substrate film and a transfer portion disposed on the substrate film to be peelable therefrom, the transfer portion having at least a receptor layer, on which an image is to be formed;

wherein the transfer portion has a thickness in a range of not less than 3 $\mu$m and not more than 5 $\mu$m, and peeling strength required to peel the transfer portion from the substrate film when the transfer portion is transferred to a transfer-receiving material is in a range of not less than 10 gf/inch and not more than 50 gf/inch.

18. An intermediate transfer recording medium comprising at least a substrate film and a transfer portion disposed on the substrate film to be peelable therefrom, the transfer portion having at least a receptor layer, on which an image is to be formed;

wherein the transfer portion has a thickness in a range of not less than 5 $\mu$m and not more than 10 $\mu$m, and peeling strength required to peel the transfer portion from the substrate film when the transfer portion is transferred to a transfer-receiving material is in a range of not less than 50 gf/inch and not more than 100 gf/inch.

19. An intermediate transfer recording medium comprising:

at least a substrate film and a transfer portion disposed on the substrate film to be peelable therefrom, the transfer portion having at least a receptor layer, on which an image is to be formed;

wherein the transfer portion has a thickness in a range of not less than 10 $\mu$m and not more than 20 $\mu$m, and peeling strength required to peel the transfer portion from the substrate film when the transfer portion is transferred to a transfer receiving material is in a range of not less than 100 gf/inch and not more than 150 gf/inch.

* * * * *